（12）United States Patent
Naoi et al.

(10) Patent No.: US 8,005,931 B2
(45) Date of Patent: Aug. 23, 2011

(54) SERVICE PROVIDING APPARATUS

(75) Inventors: Kanae Naoi, Kyoto (JP); Katsuya Nakagawa, Kizugawa (JP); Hideyuki Otokawa, Nara (JP); Azusa Umemoto, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 122 days.

(21) Appl. No.: 12/301,004

(22) PCT Filed: May 2, 2007

(86) PCT No.: PCT/JP2007/059358
§ 371 (c)(1),
(2), (4) Date: Jan. 12, 2009

(87) PCT Pub. No.: WO2007/132677
PCT Pub. Date: Nov. 22, 2007

(65) Prior Publication Data
US 2009/0187647 A1    Jul. 23, 2009

(30) Foreign Application Priority Data

May 17, 2006   (JP) ................................. 2006-138196

(51) Int. Cl.
*G06F 15/177* (2006.01)
(52) U.S. Cl. ...................................................... 709/222
(58) Field of Classification Search .................... 709/222
See application file for complete search history.

(56) References Cited

U.S. PATENT DOCUMENTS

| 6,230,184 | B1  | 5/2001  | White et al. |
| 6,546,554 | B1  | 4/2003  | Schmidt et al. |
| 6,968,499 | B1  | 11/2005 | Minami et al. |
| 7,178,101 | B2* | 2/2007  | Tunning ....................... 715/236 |
| 2006/0242162 | A1* | 10/2006 | Conner et al. ................ 707/100 |
| 2007/0266176 | A1* | 11/2007 | Wu ................................ 709/242 |
| 2008/0235301 | A1* | 9/2008  | Wright et al. ................ 707/205 |

FOREIGN PATENT DOCUMENTS

| JP | 10-260873 A  | 9/1998 |
| JP | 11-102289 A  | 4/1999 |

(Continued)

OTHER PUBLICATIONS

UNIX Magazine vol. 13 No. 7 pp. 40-45.

*Primary Examiner* — J Bret Dennison
(74) *Attorney, Agent, or Firm* — Birch, Stewart, Kolasch & Birch, LLP

(57) ABSTRACT

A service providing apparatus 100 capable of providing a service while effectively managing execution codes and screen configuration information stored in the apparatus includes: a display apparatus 108; a communication unit 101; an obtaining unit 151 for obtaining an execution code for providing the service through communication unit 101; an execution code storage 102 for storing the obtained execution code; a screen configuration information storage 103 for storing screen configuration information defining screen configuration to be displayed at the time of execution of the execution code; and a management unit 104 managing these units such that by the time the service is provided, the execution code and screen configuration information necessary for providing the service are stored in the execution code storage 102 and screen configuration information storage 103, and executing, in response to a service providing instruction, the execution code stored in the execution code storage 102 using the screen configuration information stored in the screen configuration information storage 103.

27 Claims, 17 Drawing Sheets

FOREIGN PATENT DOCUMENTS

| | | |
|---|---|---|
| JP | 2001-51821 A | 2/2001 |
| JP | 2002-7134 A | 1/2002 |
| JP | 2002-528791 A | 9/2002 |
| JP | 2002-366352 A | 12/2002 |
| JP | 2003-521036 A | 7/2003 |
| JP | 2003-319370 A | 11/2003 |
| JP | 2005-202518 A | 7/2005 |

* cited by examiner

FIG. 4

| | A:EXECUTION CODE | SCREEN CONFIGURATION INFO | | DAYS ELAPSED FROM LAST EXECUTION |
| --- | --- | --- | --- | --- |
| | | B: LAYOUT INFO | C: SCREEN CONFIGURATION COMPONENT | |
| SERVICE1 | A1 | B1 B2 B3 | C1 C2 C3 | 10 DAYS |
| SERVICE2 | A2 | B2 B4 B5 | C1 C2 C4 | 2 DAYS |
| SERVICE3 | A3 | B3 B5 B6 | C1 C3 C5 | 37 DAYS |

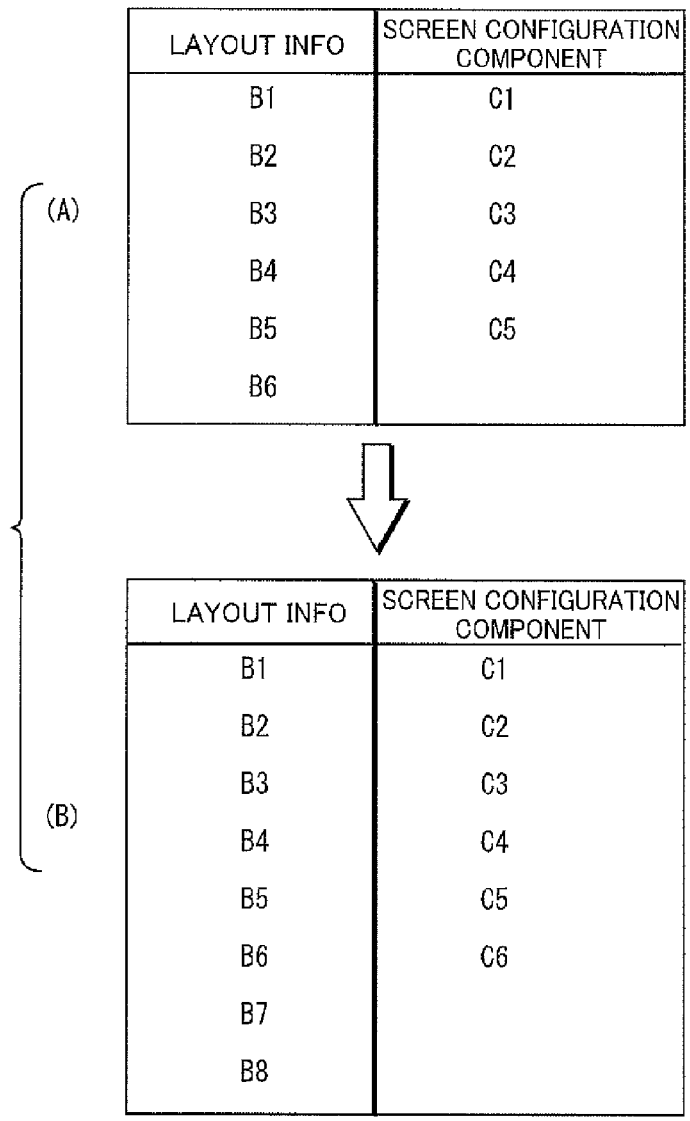

FIG. 7

| | A: EXECUTION CODE | SCREEN CONFIGURATION INFO | |
|---|---|---|---|
| | | B: LAYOUT INFO | C: SCREEN CONFIGURATION COMPONENT |
| SERVICE1 | A1 | *B1*<br>*B2*<br>B3 | C1<br>C2<br>*C3* |
| SERVICE2 | A2 | *B2*<br>B4<br>B5 | C1<br>C2<br>C4 |
| SERVICE3 | A3 | B3<br>B5<br>B6 | C1<br>*C3*<br>*C5* |
| SERVICE4 | A4 | *B1*<br>*B2*<br>B7<br>B8 | *C3*<br>*C5*<br>C6 |

SERVICE PROVIDING APPARATUS

TECHNICAL FIELD

The present invention relates to a service providing apparatus providing a service to a user using an execution code prepared on the side of a server and, more specifically, to a service providing apparatus for providing a service-utilizing environment with screen transition in an environment requested by the user, using a plurality of different pieces of screen configuration information and execution codes prepared on the side of the server and resources held by the service providing apparatus.

BACKGROUND ART

Approaches for providing various services to users of network-connected apparatuses, utilizing network technology, have been proposed and put to practical use. In a typical approach, a Web server and a data base accessible from the server are related to each other by a program running on the server side, the database is accessed using information input by the user, and the information to be presented to the user is output to a user terminal in HTML (HyperText Markup Language) or XML (eXtensible Markup Language) format.

In the present specification, such a service providing system that utilizes a program running on the server side will be referred to as a Web service.

In the Web service, it is necessary to form various HTML or XML documents in accordance with an input or a result of access to the database. Further, it is often the case that, depending on the service to be provided, screen of totally different formats must be formed even if related processes are almost the same, or screen impression must be consistent even if services are different. In the conventional Web service system, a portion describing the screen is embedded in a logic (program) portion for providing the service and, therefore, in such a case, modification such as a change to the screen only, or a change to the logic only while maintaining the screen intact is very difficult. Further, the conventional system also has a problem that program development on a so-called multiplatform is difficult.

Various methods have been proposed to solve these problems.

Patent Document 1 proposes a program generator for forming a source program to provide Web service. In this system, for forming the Web service, an XML program of a unique format describing attributes of items to be displayed on the screen and an HTML program controlling screen design are prepared as separate programs. The program generator converts the XML program and the HTML program to a source program to be usable on the Web, by adding general functions such as a log output function and a screen transition destination. According to the technique described in Patent Document 1, if only the screen design is to be changed, only the HTML program has to be changed. If only the display item is to be changed, only the XML program has to be changed. In either case, a source program in which only the screen design or only the display item is changed, can be obtained by activating the source program generator again.

Patent Document 2 discloses a display information fixing apparatus for substituting content to be embedded in a template. In the system, pieces of content specifying information are associated with a page template as an object of display. When the display conditions associated with each piece of content specifying information are fixed, the display information fixing apparatus substitutes the content to be embedded in the page template in accordance with the conditions. By this apparatus, various contents can be embedded in one same template depending on conditions and transmitted to the client, without modifying the server program. Therefore, the contents displayed on the client apparatus can dynamically be changed.

Patent Document 1: Japanese Patent Laying-Open No. 2002-366352

Patent Document 2: Japanese Patent Laying-Open No. 2001-51821

DISCLOSURE OF THE INVENTION

According to the technique described in Patent Document 1, the task of modifying the screen or logic would be easier. After changing the XML program or HTML file, however, the source program generator must be operated on the server side. Therefore, it is basically unfit for a use involving dynamic change of screen at the time of operation. Further, these programs are all controlled on the server side and, therefore, it is difficult to form a program that is executed with due consideration of the state of client terminal.

In the technique disclosed in Patent Document 2, one same template is used and the contents to be embedded are varied according to conditions. Therefore, dynamic change of display is possible. Here again, however, the page template and the like are controlled on the server side, and it is difficult to form a program that is executed with due consideration of the state of client terminal.

When the Web service on the server side is to be provided as described above, it becomes necessary to provide information for identifying a client or client information to be protected to the Web service, in order to distinguish clients. Transmission of such information is potentially problematic. Further, one must input same piece of information time and again for different servers.

Therefore, there is a demand for a system that allows use of services provided by the server, requires minimum information to be passed to the server, and allows a client to enjoy various and many services fit for the environment of the client.

As a method of providing such service, it may be possible to apply screen configuration information necessary for providing the service and execution code of a program executing a process for providing the service while making screen transition using the information, to a client apparatus to be stored therein, and to execute the program in accordance with the environment of the client apparatus. Conventionally, however, such a scheme has not been conceived and, therefore, there is no scheme for effectively control the screen configuration information or the execution code on the client apparatus.

The present invention was made in view of such problems and its object is to provide a service providing apparatus having functions of receiving, storing and executing information for service provision from the outside, in which execution code and screen configuration information stored in the apparatus can effectively be controlled.

Problems to be Solved by the Invention

According to a first aspect, the present invention provides a service providing apparatus for providing a service using a plurality of screens, by obtaining from outside an execution code involving a screen transition at the time of execution and by executing the code, including: a display apparatus; a communication unit communicating with another apparatus as a source providing the execution code for providing the service; a first obtaining unit obtaining a prescribed execution code from another apparatus, through the communication unit; an execution code storage unit storing execution codes obtained by the first obtaining unit; a screen configuration information storage unit storing screen configuration information for determining screen configuration to be displayed by the display apparatus when the execution code is executed; and a management unit managing the first obtaining unit, the execution code storage unit and the screen configuration information storage unit such that by the time provision of an arbitrary service starts, an execution code and screen configuration information necessary for providing the arbitrary service are stored in the execution code storage unit and the screen configuration information storage unit, and for executing, in response to reception of a service provision instruction designating an arbitrary service, the execution code corresponding to the designated service stored in the execution code storage unit, using the screen configuration information stored by the screen configuration information storage unit.

The screen configuration information storage stores beforehand the screen configuration information that becomes necessary at the time of execution of the execution code. The first obtaining unit obtains the execution code for service provision through the communication unit, and stores it in the execution code storage. The management unit manages the first storage, the execution code storage and the screen configuration information storage such that storage of information by the screen configuration information storage and the execution code storage is done before the start of service provision. When the execution code is executed, the management unit reads an execution code corresponding to the designated service from the execution code storage, and executes the same using the screen configuration information stored in the screen configuration information storage.

Preferably, the management unit includes a unit obtaining, through the communication means, a piece of screen configuration information not stored in the screen configuration information storage unit, among pieces of screen configuration information necessary for executing a prescribed execution code stored in the execution code storage unit, and a unit executing, in response to reception of a service provision instruction designating an arbitrary service, an execution code corresponding to the designated service, stored in the execution code storage unit, using the screen configuration information stored in the screen configuration information storage unit.

More preferably, the management unit further includes a unit for obtaining, through the communication unit, an execution code not stored in the execution code storage unit, among execution codes necessary for executing a prescribed execution code stored in the execution code storage unit.

The execution code may be a service script or a binary code.

Preferably, each of the execution codes and the pieces of screen configuration information is allocated with an identifier allowing identification. An execution code for providing the service is associated with an identifier of an execution code used at the time of executing the execution code or an identifier of a piece of screen configuration information used at the time of executing the execution code. The management unit manages the first obtaining unit, the execution code storage unit and the screen configuration information storage unit, based on the identifier related to each of the execution codes and the identifier allocated to each of the pieces of screen configuration information.

More preferably, the screen configuration information includes a screen configuration component as an element forming the screen, and layout information defining a layout of the screen configuration component on the screen.

More preferably, the layout information is related to an identifier of a screen configuration component displayed in accordance with the layout; and the management unit manages the first obtaining unit, the execution code storage unit and the screen configuration information storage unit, based on the identifier of the piece of screen configuration information used by the layout information included in an execution code for providing a service.

More preferably, the execution code may include a code for calling another execution code; and the management unit includes a unit for managing the first obtaining unit, the execution code storage unit and the screen configuration information storage unit such that by the time provision of an arbitrary service starts, an execution code necessary to provide the service, an execution code called by the execution code, and screen configuration information are stored in the execution code storage unit and the screen configuration information storage unit, and for executing, in response to reception of a service provision instruction designating an arbitrary service, the execution code corresponding to the designated service, using the screen configuration information stored in the screen configuration information storage unit.

More preferably, the management unit changes contents of the screen configuration information stored in the screen configuration information storage unit, in accordance with a prescribed condition.

The execution code may include a description of changing an execution code or screen configuration information used for executing a service in accordance with a prescribed condition. The management unit includes a unit for managing the first obtaining unit, the execution code storage unit and the screen configuration information storage unit such that by the time provision of an arbitrary service starts, an execution code and screen configuration information necessary for providing the service are stored in the execution code storage unit and the screen configuration information storage unit, and a unit for executing, in response to reception of a service providing instruction designating an arbitrary service, for executing an execution code corresponding to the designated service stored in the execution code storage unit, using the screen configuration information stored by the screen configuration information storage unit. The execution unit changes an execution code or screen configuration information used at the time of executing the service, in accordance with a description of the execution code as an object of execution.

Preferably, the execution code may include a description of changing an execution path of an execution code used for executing a service in accordance with a prescribed condition. The management unit includes a unit for managing the first obtaining unit, the execution code storage unit and the screen configuration information storage unit such that by the time provision of an arbitrary service starts, an execution code and screen configuration information necessary for providing the service are stored in the execution code storage unit and the screen configuration information storage unit, and a unit for executing, in response to reception of a service providing instruction designating an arbitrary service, for executing an execution code corresponding to the designated service stored in the execution code storage unit, using the screen configuration information stored by the screen configuration information storage unit. The execution unit changes an execution path at the time of executing the service, in accordance with a description of the execution code as an object of execution.

More preferably, service providing apparatus further includes a service start information obtaining unit for accessing an apparatus as a source of providing a prescribed service through the communication unit, and upon detection of a start of provision of a new service by the apparatus as the service provision source, for causing the first obtaining unit to obtain an execution code for providing the new service.

More preferably, the service start information obtaining unit includes a unit for periodically accessing the apparatus as the service provision source and upon detection of a start of provision of a new service by the apparatus as the service provision source, for causing the first obtaining unit to obtain an execution code for providing the new service.

The service start information obtaining unit may include a unit for receiving an instruction by the user to obtain a service, and a unit for accessing the apparatus as a source of providing a designated service in response the user instruction, and for causing the first obtaining unit to obtain an execution code for providing the designated service from the apparatus as the service provision source.

Preferably, the service providing apparatus further includes a capacity securing unit for performing a process of securing, in the execution code storage unit or the screen configuration information storage unit, a capacity equal to or larger than the capacity necessary for storing execution codes and pieces of screen configuration information associated with an execution code to be obtained by the first obtaining unit, before the first obtaining unit obtains the execution code from another apparatus.

The capacity securing unit may include a unit for deleting, before the first obtaining unit obtains an execution code from another apparatus, an execution code and a piece of screen configuration information associated with an execution code satisfying a prescribed condition among the execution codes stored in the execution code storage unit, from the execution code storage unit and the screen configuration information storage unit, and a unit for repeatedly operating the deleting unit, until a capacity equal to or larger than the capacity necessary for storing the execution code and screen configuration information associated with the execution code to be obtained by the first obtaining unit is secured in the execution code storage unit and the screen configuration information storage unit.

Preferably, the prescribed condition may be that it is a least recently used execution code, that it is a least frequently used execution code, that it is an execution code stored longest in the execution code storage unit, or that it is an execution code of which frequency of use is not higher than a prescribed value.

The capacity securing unit includes a unit for deleting, in connection with a service not used for a prescribed time period from last use, at least part of the execution code or the screen configuration information for providing the service.

Preferably, a service may have a piece of information allocated for indicating available time period of the service, and the service providing apparatus further includes a unit for deleting at least part of the execution code or the screen configuration information related to a service of which available time period has expired, from the execution code storage unit or the screen configuration information storage unit.

More preferably, a service may have a piece of information allocated for indicating available number of use of the service, and the service providing apparatus further includes: a counting unit for counting the number of provisions of at least the service having the piece of information indicating available number of use of the service added; and a unit for deleting at least part of the execution code or the screen configuration information related to a service that has been provided for the available number of use as counted by the counting unit.

An execution code for providing a service may have a piece of obtaining time information allocated to indicate a time to obtain another execution code or screen configuration information necessary for executing the execution code. The management unit includes an obtaining time information detecting unit for detecting another execution code or screen configuration information described in the execution code obtained by the first obtaining unit and having the obtaining time information allocated, a second obtaining unit for obtaining, at an arbitrary timing, another execution code or screen configuration information described in the execution code obtained by the first obtaining unit and not having the obtaining time information allocated, a third obtaining unit for obtaining the said another execution code or the screen configuration information detected by the obtaining time information detecting unit as having the obtaining time information allocated, at a time in accordance with the obtaining time information, and for storing them in the execution code storage unit or the screen configuration information storage unit, respectively, and an executing unit for executing, in response to reception of a service provision instruction designating an arbitrary service, an execution code corresponding to the designated service stored in the execution code storage unit, using the screen configuration information stored by the screen configuration information storage unit.

More preferably, the second obtaining unit includes a unit for successively obtaining as needed, the said another execution code or the screen configuration information described in the execution code obtained by the first obtaining unit and not having the obtaining time information allocated, after the first obtaining unit obtained the execution code.

More preferably, the obtaining time information indicates that the said another execution code and the screen configuration information are to be obtained at the time of execution of the execution code for providing the service; and the third obtaining unit includes a unit for obtaining, in response to the executing unit receiving the instruction, another execution code and screen configuration information necessary for executing the execution code for providing the service designated by the instruction, from another apparatus through the communication unit, and for storing them in the execution code storage unit and the screen configuration information storage unit, respectively.

The obtaining time information indicates, in response to reception of a prescribed notice from a source providing an execution code for providing the service, that the said another execution code and the screen configuration information are to be obtained from the provision source; and the third obtaining unit includes a unit for obtaining, in response to reception of the prescribed notice from the provision source through the communication unit, another execution code and screen configuration information necessary for executing the execution code for providing the service designated by the notice, from the provision source through the communication unit, and for storing them in the execution code storage unit and the screen configuration information storage unit, respectively.

According to a second aspect, the present invention provides a computer program causing, when executed by a computer connected to a display and a communication apparatus, the computer to function as a service providing apparatus including: a first obtaining unit obtaining a prescribed execution code from the said another apparatus, through a communication unit; an execution code storage unit storing execution codes obtained by the first obtaining unit; a screen configuration information storage unit storing screen configuration information for determining screen configuration to be displayed by the display apparatus when the execution code is executed; and a management unit managing the first obtaining unit, the execution code storage unit and the screen configuration information storage unit such that by the time provision of an arbitrary service starts, an execution code and screen configuration information necessary for providing the arbitrary service are stored in the execution code storage unit and the screen configuration information storage unit, and for executing, in response to reception of a service provision instruction designating an arbitrary service, the execution code corresponding to the designated service stored in the execution code storage unit, using the screen configuration information stored by the screen configuration information storage unit.

According to a third aspect, the present invention provides a computer readable recording medium on which the above-described computer program is recorded.

Effects of the Invention

According to the present invention, the management unit manages the first obtaining unit, the execution code storage and the screen configuration information storage such that the execution code and the screen configuration information necessary for providing the service are stored in the execution code storage and the screen configuration information storage before the start of providing an arbitrary service. By the time the service provision starts, these are fully prepared. Therefore, the service can be provided while the execution code and the screen configuration information stored in the apparatus are managed effectively.

When an execution code for a new service is to be stored, the storage capacity in the storage is secured. For this purpose, execution codes and screen configuration information that are considered posing no problem even if erased are erased until a prescribed storage capacity is secured, in accordance with a prescribed standard. Thus, the service can be provided effectively while the storage capacity of the storage is efficiently used.

The execution code is adapted to include a description for changing an execution path of the execution code in accordance with prescribed conditions or a description for changing contents of the screen configuration information or the execution code and, therefore, various services can be realized using limited execution codes.

Further, control that obtains the screen configuration information or other execution code to be described in the execution code at the time of execution is also possible. By the service providing apparatus, it is possible to get and use latest execution code or screen configuration information when necessary for providing a service. As a result, it becomes possible to provide the latest service while effectively managing the execution code and screen configuration information stored in the apparatus.

BRIEF DESCRIPTION OF THE DRAWINGS

FIG. 4 shows, in the form of a table, exemplary contents stored in a management information storage 111 of service providing apparatus 100.

FIG. 5 shows contents stored in a layout information storage 105 and screen configuration component storage 106, before and after obtaining the execution code, in accordance with the first embodiment.

FIG. 6 shows examples of execution code, layout information and screen configuration components necessary for executing a service.

FIG. 7 shows, in the form of a table, exemplary contents stored in management information storage 111 after obtaining the service shown in FIG. 6.

Figure 1:
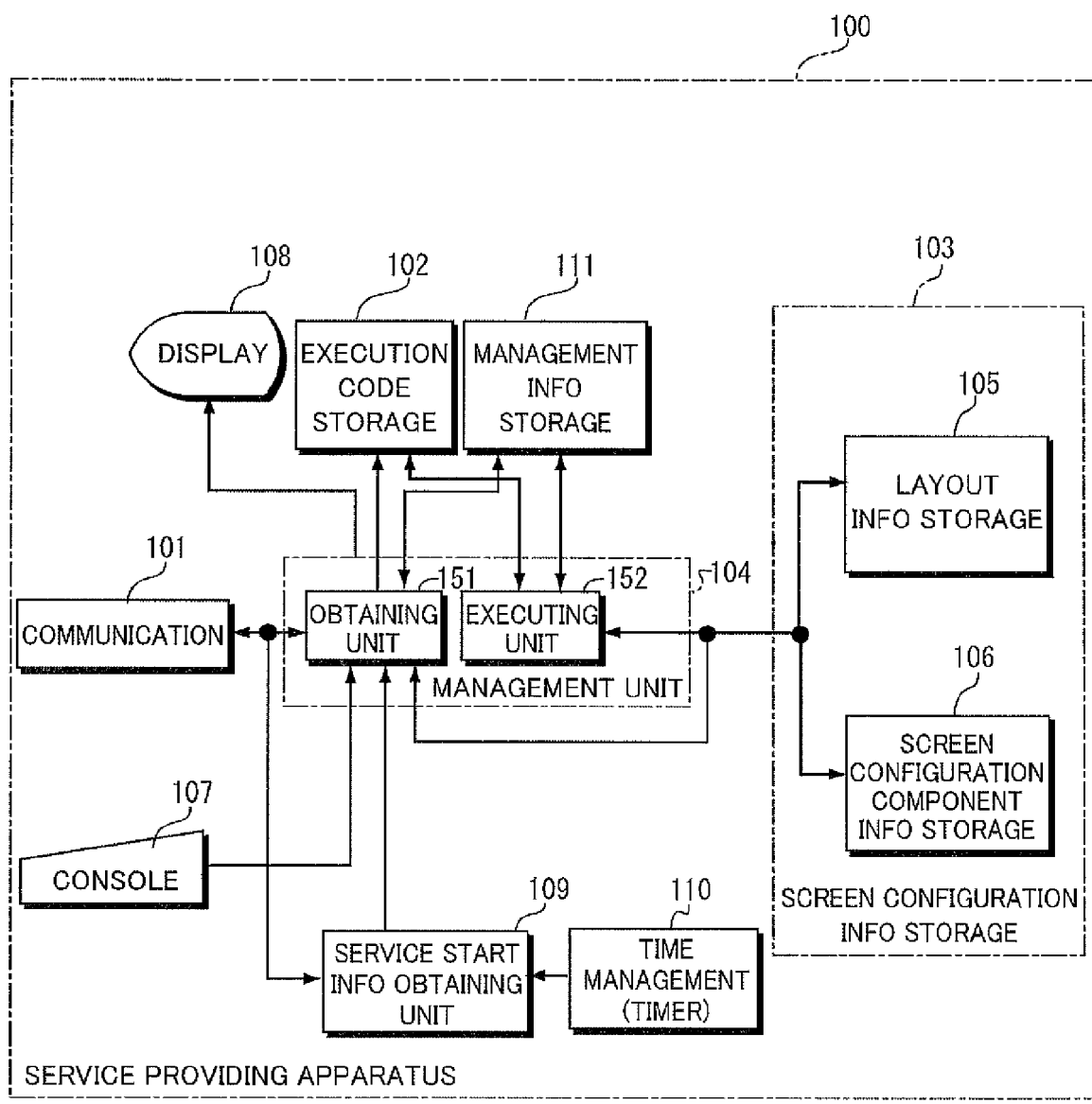
FIG. 1 is a block diagram of a service providing apparatus 100 in accordance with the first embodiment of the present invention.

DESCRIPTION OF REFERENCE CHARACTERS 100, 800, 1250 service providing apparatuses, 101 a communication unit, 102 execution code storage, 103 screen configuration information storage, 104, 801, 1251 management units, 105 layout information storage, 106 screen configuration component storage, 107 a console, 108 a display, 109 a service start information obtaining unit, 110 a time management unit, 111 management information storage, 151, 1261 obtaining units 152, 804, 1262 executing units, 802 a determining unit, 1263 an on-the-fly obtaining unit.

BEST MODES FOR CARRYING OUT THE INVENTION

<Configuration>

FIG. 1 shows, in a block diagram, the configuration of a service providing apparatus 100 in accordance with the first embodiment of the present invention. Referring to FIG. 1, service providing apparatus 100 includes: a communication unit 101 obtaining information necessary for the service from an external apparatus through a network such as the Internet; an execution code storage unit 102 storing an execution code including screen transition information when the service obtained from the outside is to be executed; a screen configuration information storage 103 storing screen configuration information, which is for determining screen configuration when the service is executed (when the execution code is executed); a management unit 104 obtaining an execution code and screen configuration information for a service from the outside through communication unit 101, storing and managing the code and information in execution code storage 102 and screen configuration information storage 103, respectively, and executing a designated service in response to a user instruction received through a console 107; and a management information storage 111 connected to management unit 104 for storing a management table maintained by management unit 104 in order to manage the execution code stored in execution code storage 102 and the screen configuration information stored in screen configuration information storage 103.

Management unit 104 includes: an obtaining unit 151 obtaining an execution code for a service from an external server and storing it in execution code storage 102, analyzing the execution code, and obtaining, through communication unit 101, execution code or codes and screen configuration information such that all execution codes necessary to execute the service are stored in execution code storage 102 and all pieces of screen configuration information are stored in screen configuration information storage 103; and an executing unit 152 responsive to an instruction to execute a service given from a user through console 107, for reading and executing the execution code and the screen configuration information necessary to execute the service, from execution code storage 102 and screen configuration information storage 103, respectively, by making a reference to management information storage 111.

Screen configuration information storage 103 includes: a layout information storage 105 for storing screen layout information displayed when the service is executed; and screen configuration component storage 106 for storing screen configuration components necessary for configuring a screen for providing the service, such as an image embedded in layout information and transition branching information.

The execution code, layout information and screen configuration component each have identifiers allocated to enable identification. Further, each execution code is associated with an identifier of another execution code or screen configuration information to be used therein. Management unit 104 manages the execution code and the screen configuration information based on the identifier information. When an execution code is executed, sometimes it is necessary to store input data and the like. In the present embodiment, it is assumed that such data and the like are all stored by the associated screen configuration component.

Service providing apparatus 100 further includes: a console 107 having a plurality of keys and generating, when a prescribed key is operated, a corresponding key code and applying it to management unit 104; a service start information obtaining unit 109 accessing an external server through communication unit 101 at a prescribed timing and, if a new service is provided, instructing the obtaining unit 151 of management unit 104 to receive an execution code necessary for executing the service from an external device; a time management unit (timer) 110 referred to by service start information obtaining unit 109; and a display 108 for displaying a screen generated as a result of execution of the service by the executing unit 152.

The execution code stored in execution code storage 102 may be of a service script or binary format. In the present embodiment, it is assumed to be of the service script format. As will be described later, in order to effectively use the memory, in the present embodiment, when obtaining unit 151 is to store a new piece of screen configuration information in screen configuration information storage 103 and the storage area is insufficient, it deletes a piece or pieces of screen configuration information selected in accordance with a prescribed algorithm. For this purpose, management unit 104 maintains date and time of last use of already stored services, of which information is stored in management information storage 111.

Referring to FIG. 4, management information storage 111 stores, for each service, screen configuration information including an identifier of an execution code necessary for providing the service, an identifier of layout information used when the execution code is executed and an identifier of a screen configuration component, and elapsed number of days from the date of last execution of the service. In the example shown in FIG. 4, for a first service, the execution code is Execution Code A1, and when Execution Code A1 is executed, pieces of layout information B1 to B3 and screen configuration components C1 to C3 are used. For the second and third services, information is stored in the similar manner.

Figure 2:
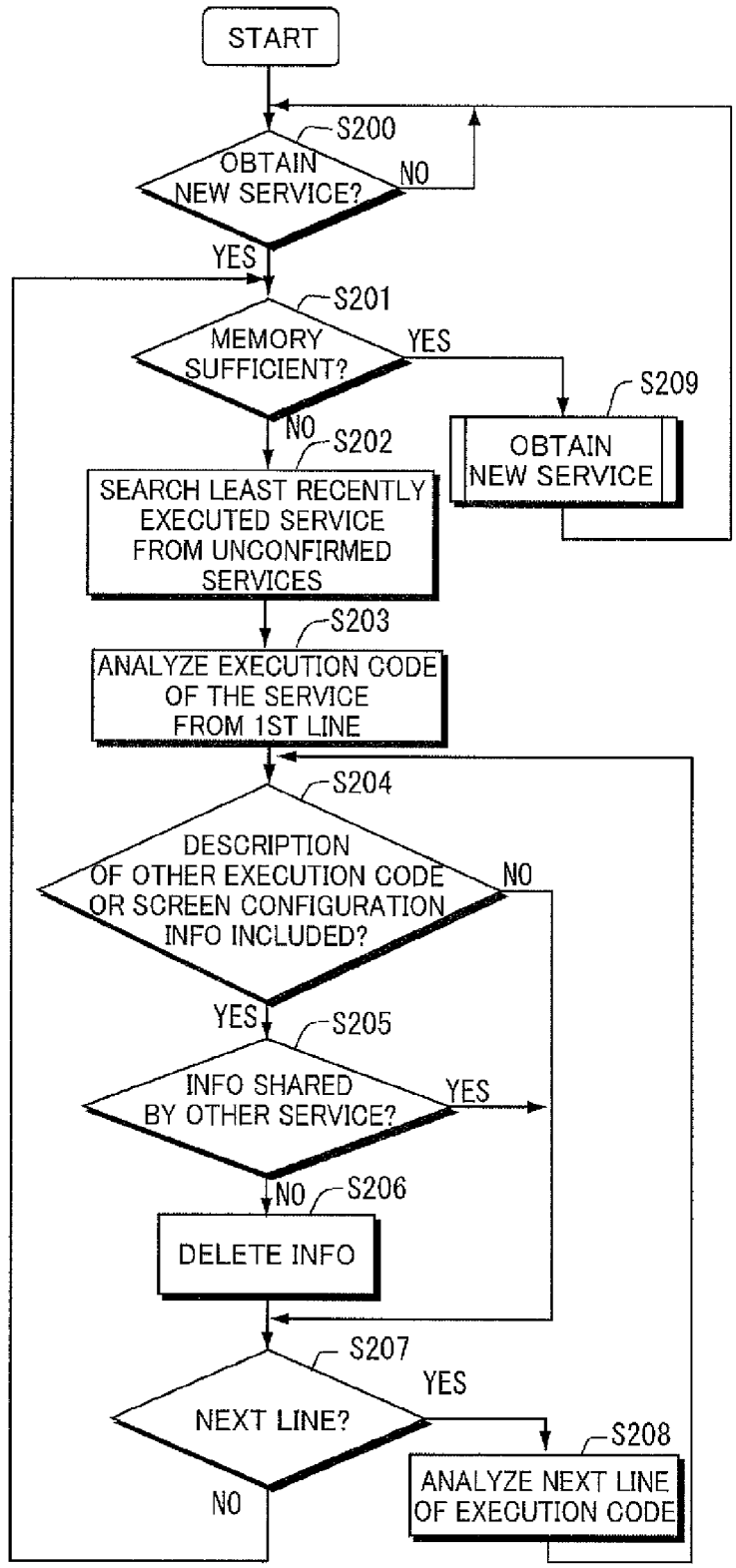
FIG. 2 is a flowchart of a program when a service execution code is obtained, executed by service providing apparatus 100.

FIG. 2 is a flowchart of a process performed when service providing apparatus 100 obtains a new service.

Referring to FIG. 2, at step (hereinafter simply denoted as "S") 200, whether or not a new service is to be obtained is determined. Whether the service is to be obtained or not is determined, in the present embodiment, by an instruction from service start information obtaining unit 109 or a user instruction through console 107. If a new service is not to be obtained as a result of determination at S200, the flow returns to S200. If it is to be obtained, the flow proceeds to S201.

At S201, whether there is sufficient memory is left in service providing apparatus for obtaining the new service is determined. Specifically, at this step, first, information specifying the service to be obtained is transmitted to the server, and from the server, the storage capacity necessary for storing an execution code necessary for the service and the screen configuration information are received. The received storage capacity is compared with the remaining, available memory capacity of service providing apparatus 100. If sufficient storage capacity is left in the memory, the flow proceeds to S209. If the memory is insufficient, the flow proceeds to S202. At S209, a process for obtaining the new service takes place. This process will be described later with reference to FIG. 3.

At S202, from the information of date and time of last execution of each service, a least recently used service is searched. At S203, the first line of the execution code of the service is analyzed to find any other execution code or screen configuration information or identifiers representing these. At S204, whether a line analyzed at the immediately preceding step of the execution code includes any other execution code or screen configuration information or identifiers representing these is determined. If the line as the object of processing includes none of these, the flow proceeds to S207, and if it includes any of these, the flow proceeds to S205.

At S205, whether the execution code or screen configuration information found at S204 is used for any other service or not is determined. If it is used for other service as well, the flow proceeds to S207, and if it is not used for any other service, the flow once proceeds to S206 and then proceeds to S207.

At S206, the execution code or the screen configuration information determined to be not shared by any other service at S205 is deleted from execution code storage 102 or screen configuration information storage 103.

At S207, it is determined whether there is any line left unanalyzed in the execution code that is being processed. If all lines have been analyzed, the flow returns to S201. If there is any line left unanalyzed, the flow proceeds to S208. At S208, the next line of the execution code is analyzed to find any other execution code or screen configuration information, or identifiers representing these, and then, the flow proceeds to S204. Then, the process steps S204 to S207 and S208 are repeated until it is determined that all lines have been processed.

After returning to S201, whether there is sufficient memory left or not is again determined. If it is still insufficient, a service, of which elapsed number of days from last execution is the largest, is searched. Thereafter, the process steps S201 to 208 are repeated until it is determined at S201 that the available memory is sufficient.

Figure 3:
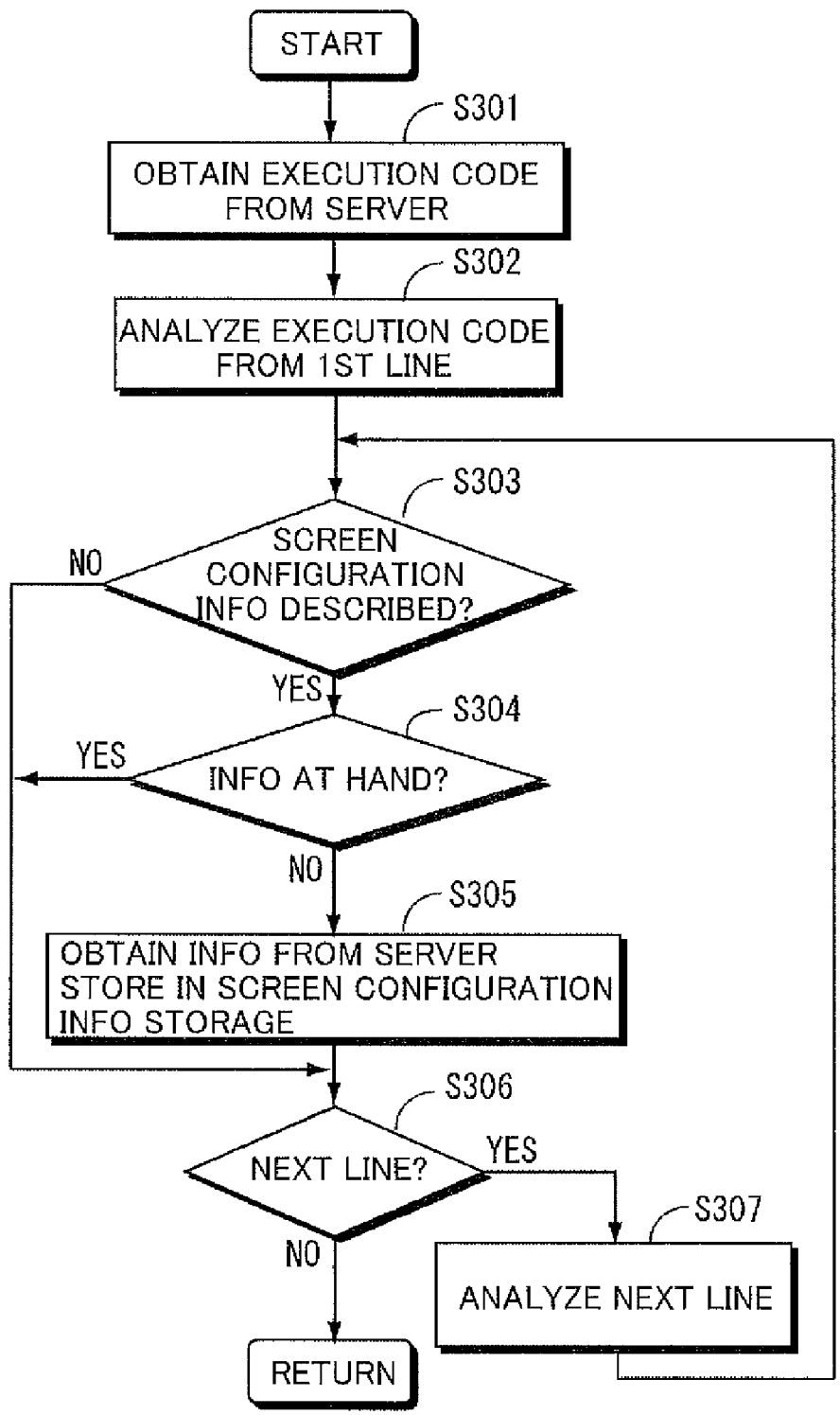
FIG. 3 is a flowchart of a program for obtaining a service execution code, executed at S209 of FIG. 2.

The flowchart of a program portion for realizing the process for obtaining the new service, executed at S209 of FIG. 2, will be described with reference to FIG. 3. Referring to FIG. 3, at S301, management unit 104 obtains all execution codes from the server through communication unit 101, and stores the codes in execution code storage 102.

At S302, the first line of obtained execution code is analyzed to find screen configuration information or an identifier indicating the information.

At S303, whether the line analyzed at the immediately preceding step includes the screen configuration information or the identifier indicating the information or not is determined. If the information or identifier is included, the flow proceeds to S306, and if not included, the flow proceeds to S304.

The process of S304 and S305 is performed for each piece of screen configuration information or each identifier found at S303. For simplicity of drawing, FIG. 3 shows the process as executed on one piece of screen configuration information or one identifier. At S304, whether or not the screen configuration information included in the execution code has already been stored in screen configuration information storage 103 is determined. If it has been stored, the flow proceeds to S306, and if not, to S305.

At S305, the screen configuration information is obtained from the server through communication unit 101 and stored in screen configuration information storage 103. Thereafter, the flow proceeds to S306.

At S306, whether there is any line left unanalyzed in the execution code is determined. If the analysis has been done to the last, the process ends, and the flow returns to S200 of FIG. 2. If there is any line left, the flow proceeds to S307. At S307, the next line of the execution code is analyzed to find the screen configuration information or the identifier indicating the information. Then, the flow returns to S303.

<Operation>

Service providing apparatus 100 operates in the following manner.

Referring to FIG. 1, when the user operates console 107 and thereby instructs obtaining unit 151 of management unit 104 to obtain the new service, management unit 104 starts the service obtaining process. When service start information obtaining unit 109 periodically accesses an external server while making a reference to time management unit 10 and finds a new service, service start information obtaining unit 109 gives an instruction to obtain the service, to obtaining unit 151. In this case also, obtaining unit 151 starts the process for obtaining the designated service.

Specifically, the determination at 8200 of FIG. 2 is YES, and the flow proceeds to S201. At S201, first, the storage capacity necessary for obtaining the new service is obtained from the server. Thereafter, the capacity is compared with the available memory capacity of service providing apparatus 100. If the memory is insufficient, the process of S202 to S208 is executed repeatedly to secure necessary memory, and then, the flow proceeds to S209.

The process of S202 to S208 will be readily understood by a person skilled in the art from the description of configuration with reference to FIG. 2. Therefore, detailed description thereof will not be repeated here.

The process at S209 will be described with reference to FIG. 3. Referring to FIG. 3, at S301, the execution code is obtained from the server. At S302, the first line of the execution code is analyzed, to find screen configuration information or an identifier thereof. At S303, whether there is any description of screen configuration information or not is determined, and if there is any description, the flow proceeds to S304. If there is none, the flow proceeds to S306.

At S304, whether the screen configuration information or identifier thereof found at S303 is stored in screen configuration information storage 103 or not is determined. If not stored, the flow proceeds to S305, and if stored, to S306.

At S305, based on the description of screen configuration information or its identifier found at S303, the corresponding screen configuration information is received from the server, and stored in layout information storage 105 or screen configuration component storage 106, in screen configuration information storage 103. Then, the flow proceeds to S306.

At S306, whether there is a next line in the obtained execution code or not is determined. If there is no line, the process ends. If there is a line, the flow proceeds to S307, at which the next line is analyzed to find a description of the screen configuration information or its identifier. Then, the flow returns to S303.

Thereafter, the search for a description of screen configuration information, determination as to whether the screen configuration information is to be obtained or not if any description is found, and the process of obtaining if it is determined necessary, are executed repeatedly until the result of determination at S306 turns to "NO", that is, on every line of the execution code obtained at S301.

If the result of determination at S306 is "NO", the process for obtaining the new service is complete.

When a service is executed, the user designates a desired service using console 107, and applies the information thereof to management unit 104. Management unit 104 refers to management information storage 111, reads a necessary execution code from execution code storage 102, and executes using the necessary layout information and screen configuration components read from layout information storage 105 and screen configuration component storage 106. By the execution, the designated service is executed using the layout information and the screen configuration components stored in layout information storage 105 and screen configuration component storage 106.

<Specific Operation>

A specific example will be described. Now, assume that three services are stored as represented by the stored contents (FIG. 4) of management information storage 111. The execution code and the screen configuration information necessary to execute respective services are as shown in the table. Further, the elapsed number of days from the last execution of the first, second and third services are 10 days, 2 days and 37 days, respectively.

Here, the layout information and the screen configuration components stored in layout information storage unit 105 and screen configuration component storage 106 are as shown in FIG. 5(A). Specifically, there are six pieces of layout information B1 to B6 stored in layout information storage unit 105 and five screen configuration components C1 to C5 stored in screen configuration component storage 106, respectively.

Assume that Service 4 of such a configuration as shown in FIG. 6 is to be obtained. The fourth service includes an execution code A4, pieces of layout information B1, B2, B7 and B8, and screen configuration components C3, C5 and C6. From the tables of FIGS. 4 and 5(A), we can see that of the pieces of information necessary to execute the fourth service, pieces of layout information B1 and B2 and screen configuration components C3 and C5 have already been stored in service providing apparatus 100. Therefore, in order for the user to obtain the fourth service, what is necessary is simply to get the execution code A4, pieces of layout information B7 and B8, and screen configuration component C6, which are not yet held in service providing apparatus 100. FIG. 7 shows the contents stored in management information storage 111, and FIG. 5(B) shows contents stored in layout information storage unit 105 and screen configuration component storage 106, respectively, of service providing apparatus 100 after obtaining the fourth service. In FIG. 7, pieces of configuration information for the fourth service in italics represent pieces of information that had already been stored in service providing apparatus 100 before obtaining the fourth service and hence not necessary to obtain.

As described above, according to the present embodiment, when a new service is to be obtained, only a part of the configuration information of the service has to be obtained. Therefore, wasteful communication load can be avoided. Further, part of the configuration information of each service can be shared with other service or services and, therefore, memory on the side of user terminal can effectively be utilized.

Further, in the present embodiment, pieces of configuration information are independent from each other and, therefore, even if acquisition of the service should be interrupted by, for example, deteriorated communication environment, acquisition may simply be started again from the interrupted piece. This leads to higher efficiency of communication.

Further, if a screen configuration component holding individual information and the like registered by user for execution of the services is shared, it becomes unnecessary to register the individual information again for executing a new service, saving the effort of repeated registration. When some part of the information should be changed, change is needed only once, and it is unnecessary to repeat change for each and every service.

<Modification>

In the present embodiment, after the process for securing the memory is executed, the analysis of execution code for the service to be newly obtained starts. The present invention, however, is not limited to such an embodiment. By way of example, it is possible to obtain and analyze the execution code first to grasp pieces of information necessary for the execution of the service, to specify a service as an object of deletion, and if part of the information constituting the service as the object of deletion is necessary for the service to be newly obtained, such a part of information may be left stored, rather than deleted. Further, by analyzing the execution code in advance, minimum memory capacity necessary for the acquisition is known and, therefore, more-than-necessary deletion of services can be avoided.

In the present embodiment, if the service as the object of deletion includes a plurality of execution codes, it is assumed that the execution codes as the object of analysis have all necessary pieces of information described therein. The present invention, however, is not limited to such an embodiment. There may be an embodiment in which a new piece of information is included in an execution code other than the execution code as the object of analysis. In such a case, such an execution code must also be analyzed, and the process of S203 to S208 must be performed on the information included in the execution code.

As can be seen from the process of FIG. 2, particularly from the process of S204, in the service determined to be an object of deletion, at least an execution code that has been an object of analysis is not deleted but left in execution code storage 102. Therefore, if the user wishes to use the service again, it is possible to analyze the remaining execution code and thereby to newly obtain the information necessary for the service, and thus, the service can be used again easily. For some services, however, all pieces of information including the execution codes may be deleted.

In the present embodiment, the timing for obtaining a service is selected by the user, or it is determined as a result of periodical check by service start information obtaining unit 109. The present invention, however, is not limited to such an embodiment. By way of example, receiving a message notifying start of distribution of a new service from a service distributing server, information necessary for the service may be obtained automatically. Further, in the present invention, service start information obtaining unit 109 periodically checks the server state and if a new service is distributed, issues an instruction to management unit 104 so that it is automatically obtained. In place of automatic acquisition, a notice may be given to the user, to urge acquisition. Such approaches may be combined.

In the present embodiment, the execution code is analyzed line by line, and if there is any piece of information missing in service providing apparatus 100, such information is obtained as needed. The present invention, however, is not limited to such an embodiment. Missing pieces of information may be obtained collectively after the execution code is analyzed to the end, rather than obtaining the information piece by piece in mid-course.

The present embodiment assumes that the service to be obtained corresponds to one execution code. The present invention, however, is not limited to such an embodiment. An embodiment is possible that allows one service to include a plurality of execution codes. In such a case, the following approach is taken. Specifically, when the service is obtained, first at S301 of FIG. 3, the first execution code is obtained, and if there is any description related to the execution code at S302 and S307, determination is made as to whether the execution code is at hand or not, and if not, the code is obtained from the server, as in the case of screen configuration information.

After the analysis of the first execution code is completed to the end, analysis of the second execution code starts and, in the similar manner as for the first execution code, information not at hand is obtained. When analysis of all execution codes is finished, acquisition of the service is completed.

In such a situation, all pieces of information necessary for the service may be described in the execution code that is analyzed first, so that acquisition of necessary information can be finished by analyzing the execution code, without the necessity of analyzing other codes.

The present embodiment assumes that pieces of information necessary for the service are all described in the execution code. The present invention, however, is not limited to such an embodiment. The layout information may have a description format that includes screen configuration information not described in the execution code. In that case, after the end of analysis of the execution code at S306 of FIG. 3, the flow does not make a transition to S300 but analysis of pieces of layout information received by that time starts, followed by the processes of S303, S304, and S305.

Further, in the present embodiment, management unit 104 in service providing apparatus 100 at hand of the user manages the information stored in execution code storage 102 and screen configuration information storage 103, extracts information missing for the new service, and the information is obtained from the server. The present invention, however, is not limited to such an embodiment. The server may manage the service stored in the service providing apparatus, and the server may extract only the necessary information beforehand and provide the information. Alternatively, the service providing apparatus may pass a list of services stored therein to the server. In that case, the server may extract necessary information based on the list, and provide such information to the service providing apparatus.

In the present embodiment, for simplicity, it is assumed that if there is any description related to the screen configuration information in the execution code, the process proceeds to S304 of FIG. 3. The present invention, however, is not limited to such an embodiment. An embodiment may be possible in which in the screen configuration information described in the execution code, screen configuration information newly generated when user selection information is to be stored during execution of the service is included. If the service involves such information, it is necessary to further analyze the execution code and determine whether the described screen configuration information is generated at the time of service execution or not, before proceeding to S304.

In the present embodiment, the date and time of last execution is stored as additional information to the information of each service. The present invention, however, is not limited to such an embodiment. The information of date and time of last execution of each service may be collectively managed. Further, every time a service is used, the services may be ordered by the date and time of execution, for management.

The process of securing free memory capacity in advance at the time of obtaining a service as performed in the present embodiment may be omitted. In that case, if the memory should be used up while obtaining the service, the process would be terminated. In that case, however, some elements may be deleted before retrial.

In the present embodiment, as a method of extracting a service to be deleted, the date and time of last use is used as a reference. The information that serves as the reference to determine the object of deletion is not limited to these. Frequency of use or date and time of acquisition of the service may be used as a reference, and a service of which frequency of use is not higher than a prescribed value, a service that is least used, or a service for which a prescribed time period has passed from the last use, may be deleted. Further, for a service for which a prescribed time period has passed from the last use, the execution code or screen configuration information for providing the service may be deleted. The service to be deleted may be explicitly selected by the user. The user or the server may attach additional information for determining whether the service may be automatically deleted or not, to each service. When deleted, the execution code and the screen configuration information for providing the service may be deleted as a whole, or only the part of these may be deleted.

In the present embodiment, the timing when a service is deleted is when the memory runs short. The present invention, however, is not limited to such an embodiment. A service may be automatically deleted when some conditions are satisfied, for example, when a prescribed number of days or time has passed from the last execution, or frequency of use by the user attains to a prescribed value or lower, rather than when the memory runs short. If the service is offered for a limited time and the available time period of the service is determined, the service may be automatically deleted after prescribed time and date. If a service is offered as a sample, it may be automatically deleted after a prescribed number of days passed from acquisition, or after the service is used for a prescribed number of times. If the service becomes unavailable after a prescribed date and time as in the case of the service offered for a limited time, the service may be fully deleted, including the execution code. In that case, such conditions may be described in the screen configuration information or in the execution code, and when the execution code is executed, such conditions are checked first, and if the conditions for deletion are satisfied, at least part of, or all of the related execution code and the screen configuration information may be deleted. Alternatively, a program for periodically searching for a service that satisfies such conditions may be activated, and at least part of, or all of the execution code and the screen configuration information related to the found service may be deleted.

Even when a service is deleted after a prescribed date and time or a prescribed time period has passed, it may be desirable to keep some information for future use. Assume, for example, a service in which a user selects a product he/she wants from a "flier" listing a plurality of products, and performs a process for purchasing. It is often the case that there is an offering period of the products on the flier, while information necessary for the purchasing process such as selection of payment method, is kept unchanged. In that case, only some desired pieces of information such as the information related to the product, may be automatically deleted at a prescribed date and time. Here, information management would be easier if the execution code is separated into a product selection section and a purchase processing section. New product information may be obtained simultaneously with the deletion of part of the information. The timing of deletion may not be designated when a service is obtained, and part of or all of the information may be rewritten when provision of new product starts on the server side, or when a user performs a process for updating to new information.

Another example of deleting only a part of the information automatically is as follows. There may be a service that allows selection of layout information such as font size, background image and the like as preferred by the user, at the start of the service. In this situation, the unselected layout information may be automatically deleted. Here, if only a pointer related to the unselected information is left, it is possible to flexibly reflect later change of the layout information by the user, and the memory can effectively be used.

The execution code stored by execution code storage 102 may be of the service script or binary format. In the present embodiment, service script is used.

As described above, by the concept of the present embodiment, it is possible to appropriately delete unnecessary pieces of information. Therefore, the memory in the service providing apparatus can effectively be used.

By the automatic deletion of services, for example, if the number of services saved is reduced to a prescribed number or smaller, a service related to frequently used service or only an execution code thereof may be obtained automatically. If acquisition of an execution code does not consume much memory, it is possible to notify the user of the new service easily.

Second Embodiment

Figure 8:
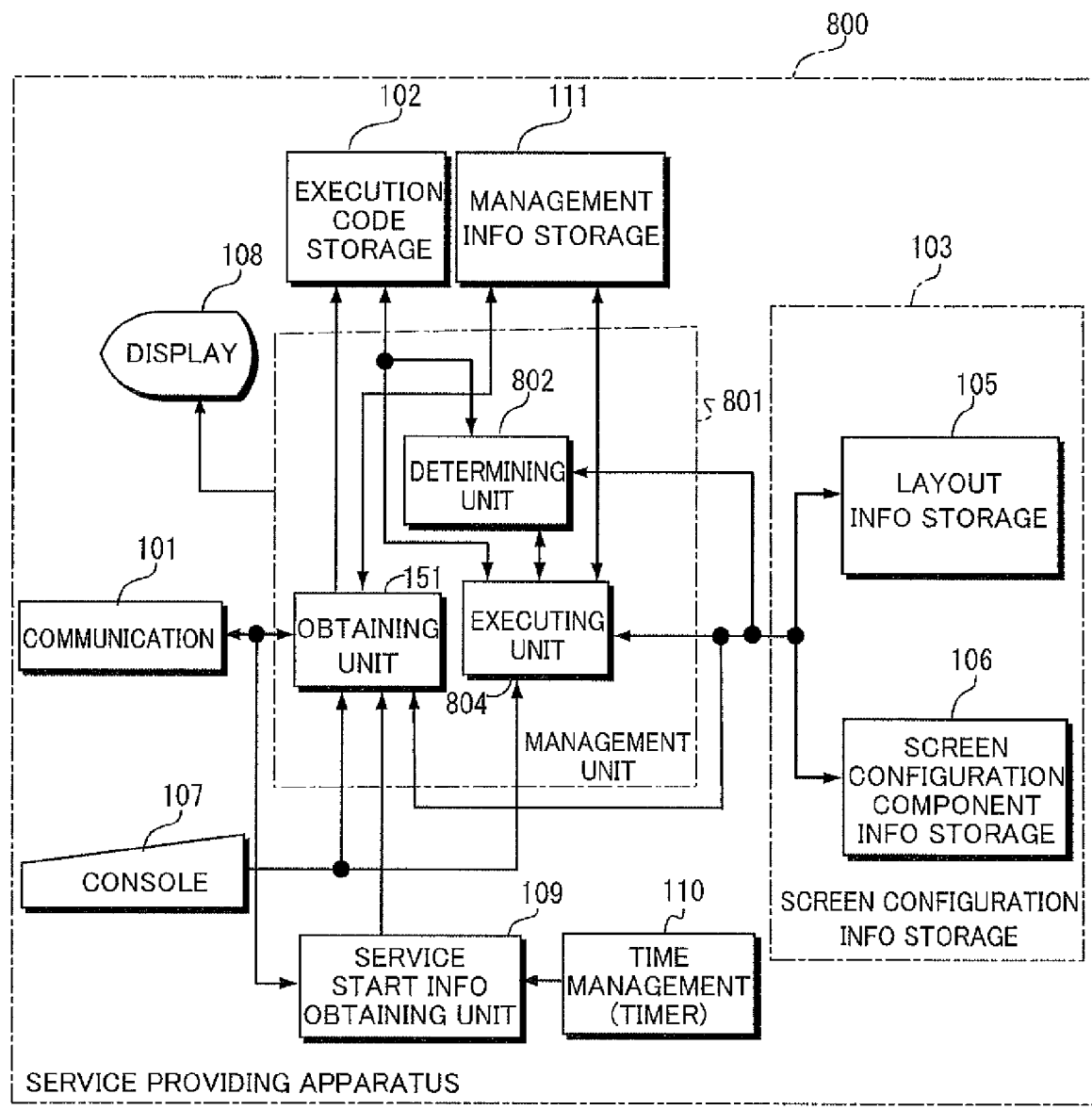
FIG. 8 is a block diagram of a service providing apparatus 800 in accordance with a second embodiment of the present invention.

FIG. 8 is a block diagram showing a configuration of a service providing apparatus 800 in accordance with the second embodiment of the present invention. Service providing apparatus 800 has a function of selecting the layout information, screen configuration component or execution code to be used, depending on the state of use by the user or environment of the apparatus, in addition to the functions of service providing apparatus 100 in accordance with the first embodiment. Therefore, an execution code stored in execution code storage 102 allows a description for selecting, based on the contents held in the screen configuration components, the layout information, a screen configuration component or an execution code related to execution of the service. In the following, such description will be referred to as a "service changing description." The service changing description is typically realized by a description for controlling execution path of an execution code according to conditions at the time of execution. Such description enables dynamic change of the service contents, when the execution code is executed.

Referring to FIG. 8, the present service providing apparatus 800 includes, in place of management unit 104 of service providing apparatus 100 shown in FIG. 1, a management unit 801 having a function of changing service contents in accordance with the service changing description when an execution code is executed.

Management unit 801 includes: obtaining unit 151 same as the obtaining unit 151 of management unit 104 in accordance with the first embodiment; an executing unit 804 having the function of executing unit 152 of the first embodiment and additionally having the function of outputting, when a service changing description is encountered in the execution code that is being executed, a request signal requesting determination of a condition of the service changing description to the outside, selecting an execution code or screen configuration information in accordance with a result of determination applied from the outside in response to the request signal, and continuing execution and analysis of the execution code; and a determining unit 802 receiving the request signal from executing unit 804, determining whether the condition for the service changing description in the execution code that is being executed by executing unit 804 is satisfied or not in accordance with information stored in the screen configuration component corresponding to the request signal, and applying the result of determination to executing unit 804.

When an execution code is executed, determining unit 802 refers to a designated screen configuration component in screen configuration component storage 106 in response to the request signal applied from executing unit 804, determines whether the condition described in the service changing description is satisfied, based on the condition designated by the request signal and the information held by the screen configuration component, and applies the result of determination to executing unit 804. Executing unit 804 selects an execution path of the execution code in accordance with the result of determination, and executes the execution code while selecting the designated layout information, screen configuration component and execution code along the execution path. As a result, by the service providing apparatus 800, part of the service contents can easily and dynamically be changed.

Figure 9:
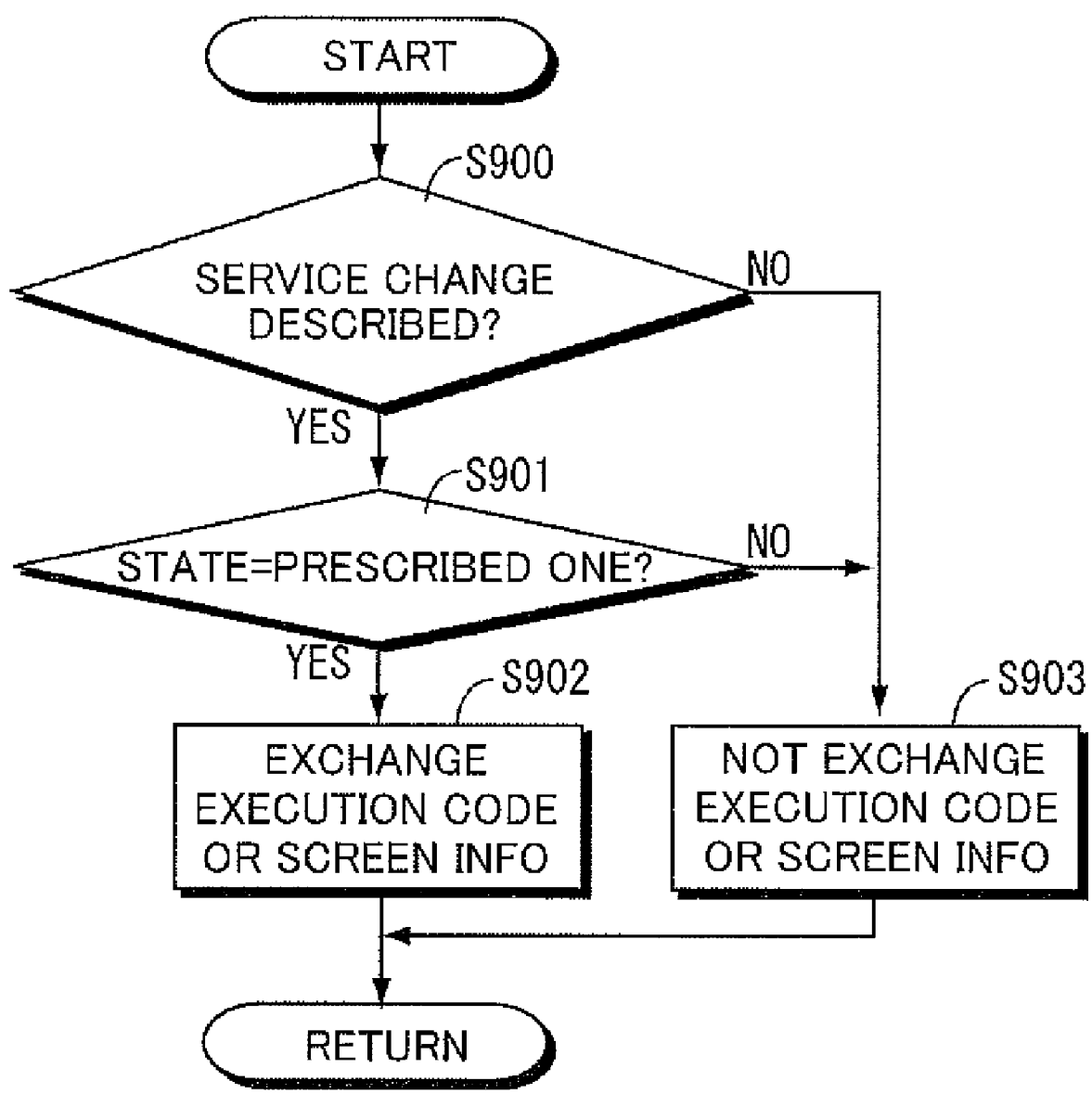
FIG. 9 is a flowchart of a program executed by a determining unit 802 of service providing apparatus 800.

FIG. 9 is a flowchart of the execution code/screen configuration information selecting process at executing unit 804 and determining unit 802. The process is performed when the executing unit 804 executes the service. Referring to FIG. 9, at S900, whether or not there is a service changing description in an execution code as the object of execution is determined. If there is, the flow proceeds to S901, and if not, to S903. The result of determination being "YES" corresponds to generation of the request signal described above.

At S901, whether the state of screen configuration component designated by the service changing description is a prescribed state designated by the service changing description or not is determined, in accordance with the condition described in the service changing description. If it is the prescribed state, the flow proceeds to S902, and if it is not the prescribed state, the flow proceeds to S903. This process corresponds to the process executed by determining unit 802.

At S902, based on the contents of the service changing description and on the state of screen configuration component, the execution code, layout information or the screen configuration component to be used is changed from that designated in the original execution path, and the process is continued using the changed execution code, layout information or screen configuration component.

At S903, process is continued with these unchanged from designated ones in the original execution path of the execution code.

The contents of screen configuration component referred to at S901 may be dynamically changed by management unit 801 depending on various conditions, including the state of use of the service by the user, state of the providing apparatus, instruction from the server side, date and time of service execution and the like. Therefore, the determination mentioned above is made every time the service is executed.

Service execution by management unit 801 is similar to that of the first embodiment except when the service changing description is encountered.

Figure 10:
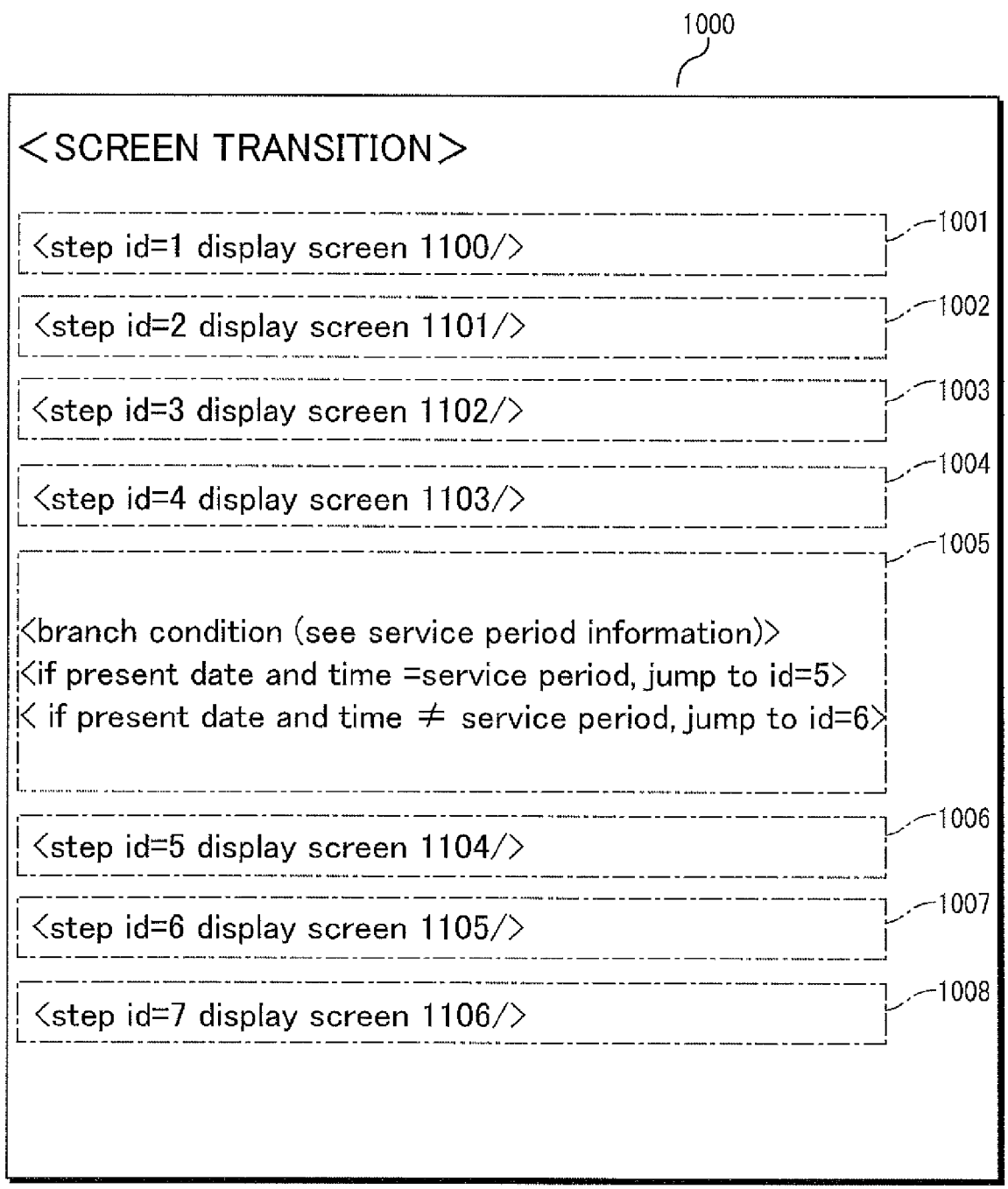
FIG. 10 shows a simplified example of the execution code.

A specific example of the process flow when the execution code is executed in accordance with the process shown in FIG. 9 will be described with reference to FIGS. 11 and 12. It is assumed that a product purchasing service is stored in service providing apparatus 800. FIG. 10 shows a simplified example of the execution code for executing the service. The execution code is stored in execution code storage 102 shown in FIG. 8.

When the user selects the service and instructs execution thereof, executing unit 804 of management unit 801 obtains a corresponding execution code 1000 stored in execution code storage 102, and starts analysis. If it is found as a result of analysis that there is a service changing description possibly requiring a change in the execution code, layout information or the screen configuration component, executing unit 804 requests determining unit 802 to make condition determination corresponding to the service changing description. Determining unit 802 determines the condition designated by the service changing description in accordance with the information held by the screen configuration component in screen configuration component storage 106, and applies the result to executing unit 804. In accordance with the result, executing unit 804 continues the process using the execution code, layout information or screen configuration component designated by the original execution path, or continues the process using the execution code, layout information or screen configuration component designated by the execution path taken when the service condition is satisfied. By this process, if the execution code includes a service changing description, an appropriate execution code, layout information and screen configuration component are selected in accordance with the information held by the screen configuration component, and used for executing the execution code. Executing unit 804 executes the execution code in this manner, and when the end of execution code is reached, the process ends.

Referring to FIG. 10, it is assumed that the execution code includes code sections 1001 to 1008. Executing unit 804 of management unit 801 obtains the screen configuration information of a screen as an object to be displayed first, shown in code section 1001, from screen configuration information storage 103, and in accordance with the screen configuration information, displays a product information screen 1100 such as shown in FIG. 11, for example, on display 108.

When the user selects a purchase of a product on product information screen 1100, executing unit 804 analyzes code section 1002 of the execution code. If the code section 1002 indicates display of such a message as shown in screen 1101 of FIG. 11, executing unit 804 reads screen configuration information necessary to display the screen 1101 from screen configuration information storage 103, and causes a transition of display to screen 1101, on display unit 108.

Figure 11:
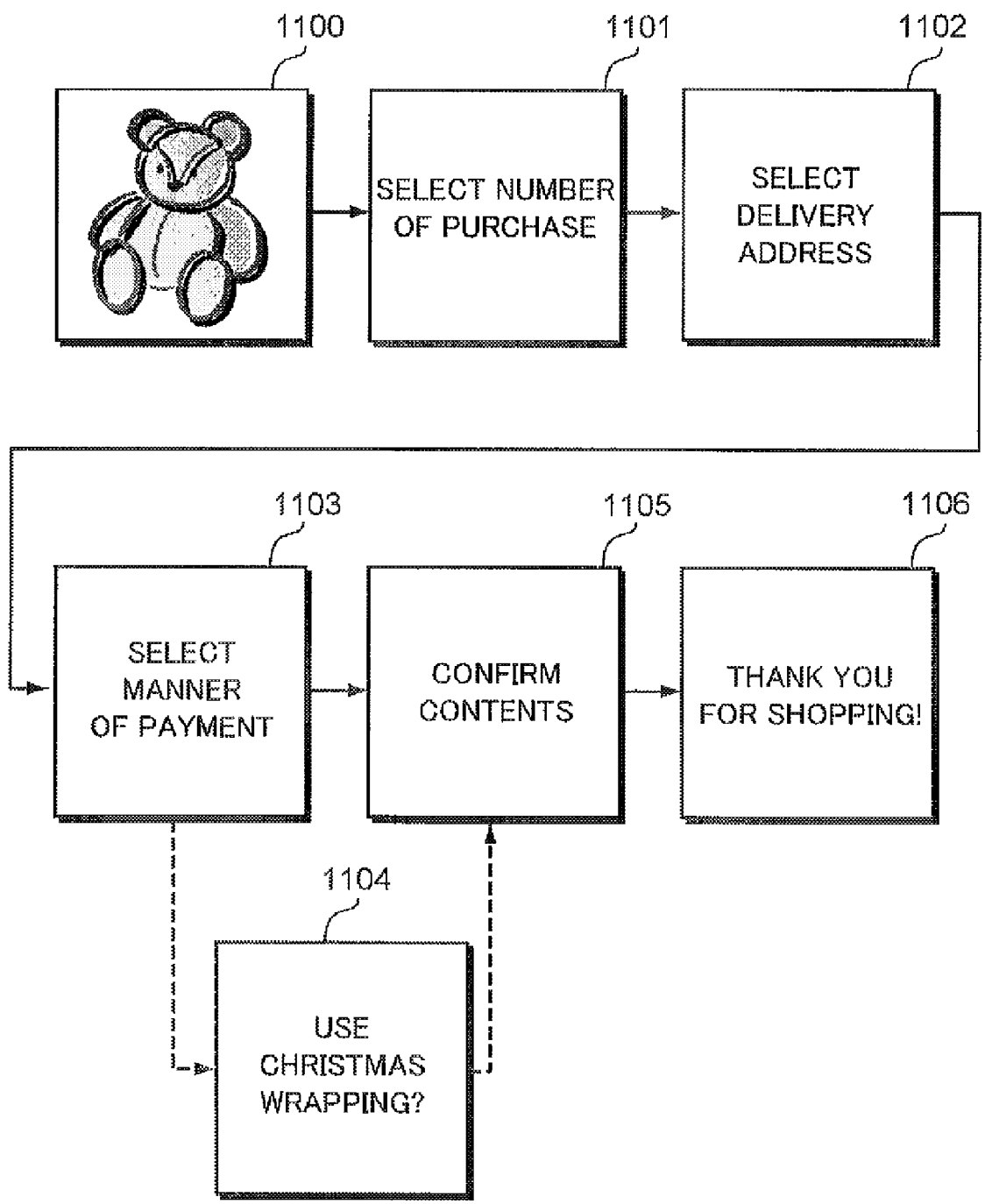
FIG. 11 shows an exemplary flow of a process executed by service providing apparatus 800.

Along with the selection by the user, analysis of execution code proceeds to code sections 1003 and 1004, and with the progress of analysis, the display changes to screens 1102 and 1103 shown in FIG. 11. When the user selects the payment method on screen 1103, the analysis of execution code proceeds to code section 1005.

Code section 1005 includes a code that changes the execution path of the code, depending on whether the present time corresponds to service period or not. Analyzing the program section 1005, executing unit 804 requests determining unit 802 to make a condition determination of code section 1005. Determining unit 802 receives the service period information from screen configuration component storage 106, to be used for the determination. Then, it determines whether the present date and time is within the period designated by the service period information or not.

If the day on which the service is used is within the period designated by the service period information, determining unit 802 instructs executing unit 804 to proceed to code section 1006, and analysis of execution code by executing unit 804 proceeds to code section 1006. Otherwise, the analysis proceeds to code section 1007.

If it is within the period designated by the service period information, code section 1006 makes a transition of the display on display 108 to screen 1104. Thereafter, code section 1007 is analyzed. Therefore, as a result of analysis of code sections 1006, 1007 and 1008, display image changes from 1004 to 1005 and further to 1006.

If it is out of the service period, code section 1006 is not analyzed and code sections 1007 and 1008 are analyzed. As a result, the display image changes to 1105 and to 1006.

As described above, according to service providing apparatus 800 of the present embodiment, it is possible to change the service contents easily dependent on conditions. The information registered for the product purchasing service described above is registered with the screen configuration component. As already described with reference to the first embodiment, if a part of the screen configuration component is shared with other service, the information can be used also by that service. Assume, for example, that a certain piece of information is registered when the first service is executed. This piece of information is stored in screen configuration information storage 103 as the screen configuration information. If this screen configuration information is to be shared by another service, the same screen configuration information is used and, therefore, already entered information can be used and it is unnecessary to newly input the information.

Specifically, when common screen configuration components are used by a plurality of services, pieces of information held by the screen configuration components can be shared among the services. By this arrangement, it becomes possible to eliminate the trouble of inputting time and again the individual information such as the destination address and the method of payment when a purchase of a product is made, every time a different service is to be used. When such information is changed, it is unnecessary to check for which of the services the information has already been updated and for which further updating is required. Further, it is possible to include a description that omits display of an input screen urging the input of already entered information, in the execution code. In that case, the number of screen transitions can be reduced, facilitating use of the service. It is often the case that the user is asked to input credit card number, when he/she uses a product purchasing service. If it is desired to omit the input of such information, in typical Web service, registration of the number with the server is necessary. Using the scheme in accordance with the present embodiment, however, the information is generally managed only in the service providing apparatus 800 and, necessary information may be passed to the server only when necessary, for example, at the time of using the service such as purchasing. It becomes unnecessary to have individual information constantly stored in an external server, and hence, one can use the credit card with higher sense of security.

Figure 12:
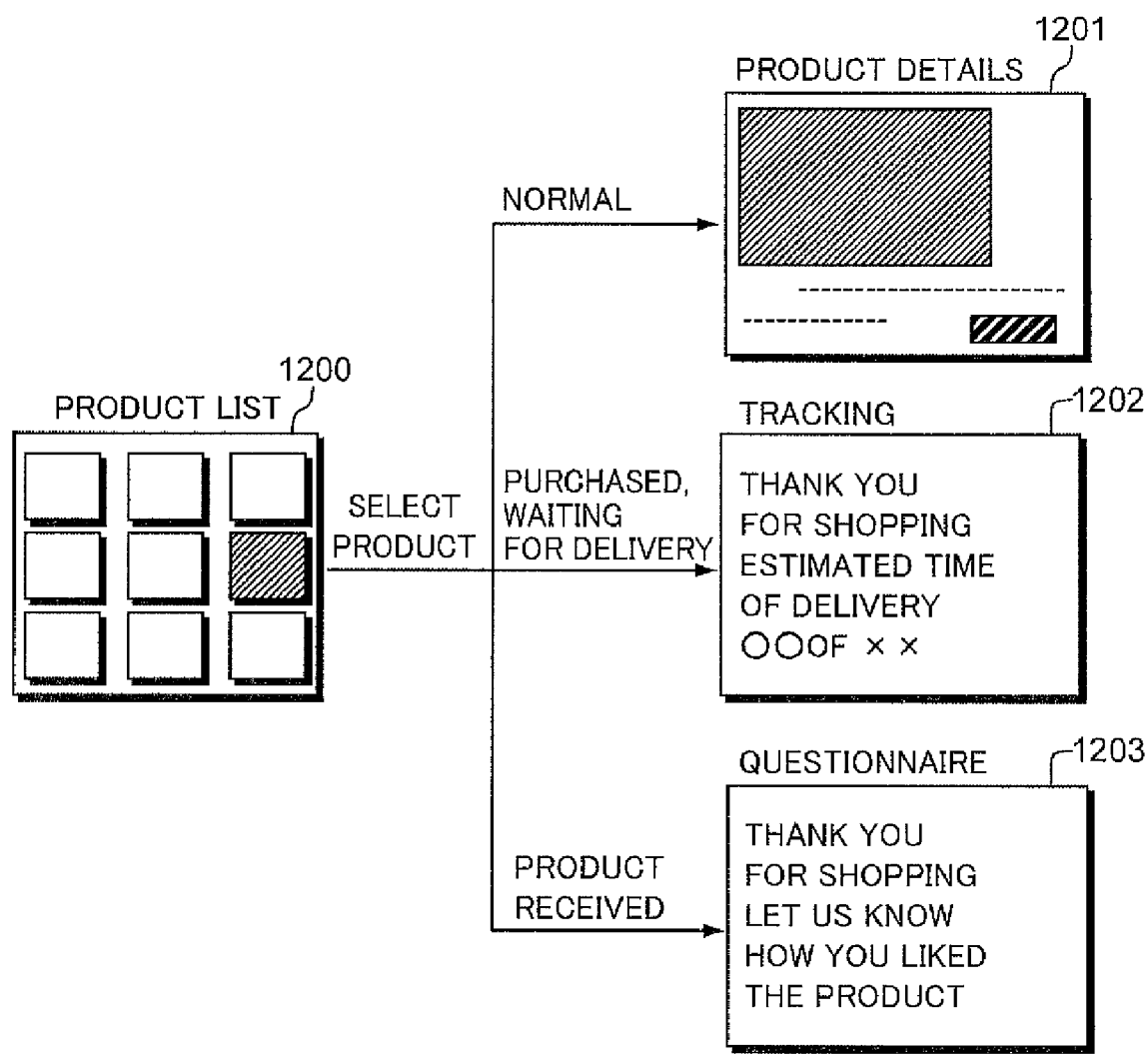
FIG. 12 shows another exemplary flow of a process executed by service providing apparatus 800.

Referring to FIG. 12, another example of the process flow by service providing apparatus 800 in accordance with the present embodiment will be described. It is assumed that a product purchasing service is stored in service providing apparatus 800. When the user executes this service, a screen 1200 including a list of products such as shown in FIG. 12 is displayed. When the user selects one product from the screen 1200 of product list, the process branches depending on the conditions at that time.

Typically, the screen makes a transition to a detailed screen 1201 of the selected product. Here, the user views details of the product on the detailed screen 1201, and proceeds to a product purchasing screen (not shown). When the user performs the process for purchasing the product, executing unit 804 of management unit 801 changes the contents of purchase state information of the user stored in screen configuration component storage 106. Executing unit 804 further obtains information of expected date and time of delivery of the purchased product to the user from the server, and stores the information in screen configuration component storage 106. After the purchasing process, when the user again executes the product purchasing service and selects a product that he/she has bought previously on the screen 1200 listing products, executing unit 804 refers to the screen configuration component storage 106 for the purchase state information of the user and the information of expected date and time of delivery, and changes the screen branch destination based on the description in the execution code.

Specifically, when it is determined that the user has already purchased the product from the purchase state information, executing unit 804 further refers to the information of expected date and time of delivery stored in screen configuration component storage 106. Based on the referenced information of expected date and time of delivery and the date and time of use of the service, whether the purchased product has been delivered or not is determined. If it is determined that the purchased product has not yet been delivered, executing unit 804 causes a transition to a delivery state screen 1202 indicating the state of delivery, rather than to the detailed screen 1201 of the product.

If it is determined that the product selected by the screen 1200 listing products has been delivered, transition to a questionnaire screen 1203 is made for a prescribed period from the time of delivery to the user. When a prescribed time period passed from the delivery to the user, or after the user once answered the questionnaire, the screen displayed here will be the detailed screen 1201 of the product. Here, if the user again selects the product he/she bought previously, the display may be directly changed to the product purchasing process, rather than to the detailed screen 1201 of the product.

In the example above, the information of expected date and time of delivery is obtained from the server and stored at the time of purchase of the product. The present invention, however, is not limited to such an embodiment. According to conditions, the date of delivery to the user may be changed. To deal with such a situation, the state of delivery may be checked by accessing the server, every time use of a service starts.

As described above, according to the present embodiment, the contents of screen configuration component may be changed in accordance with various conditions, such as the state of use of the service by the user, state of the providing apparatus, provision of information from the server side, date and time and so on. Accordingly, part of the service contents can easily and dynamically be changed.

In the embodiment described above, the execution code, layout information and screen configuration component used for executing the execution code are selected by changing the execution path of the execution code, by the service changing description. The present invention, however, is not limited to such an embodiment. An implementation in which the execution code, layout information and screen configuration component used for executing the execution code themselves are changed depending on conditions while the execution path of the execution code is not changed, or an implementation combining such an approach and the change of execution path are also possible.

Third Embodiment

Figure 13:
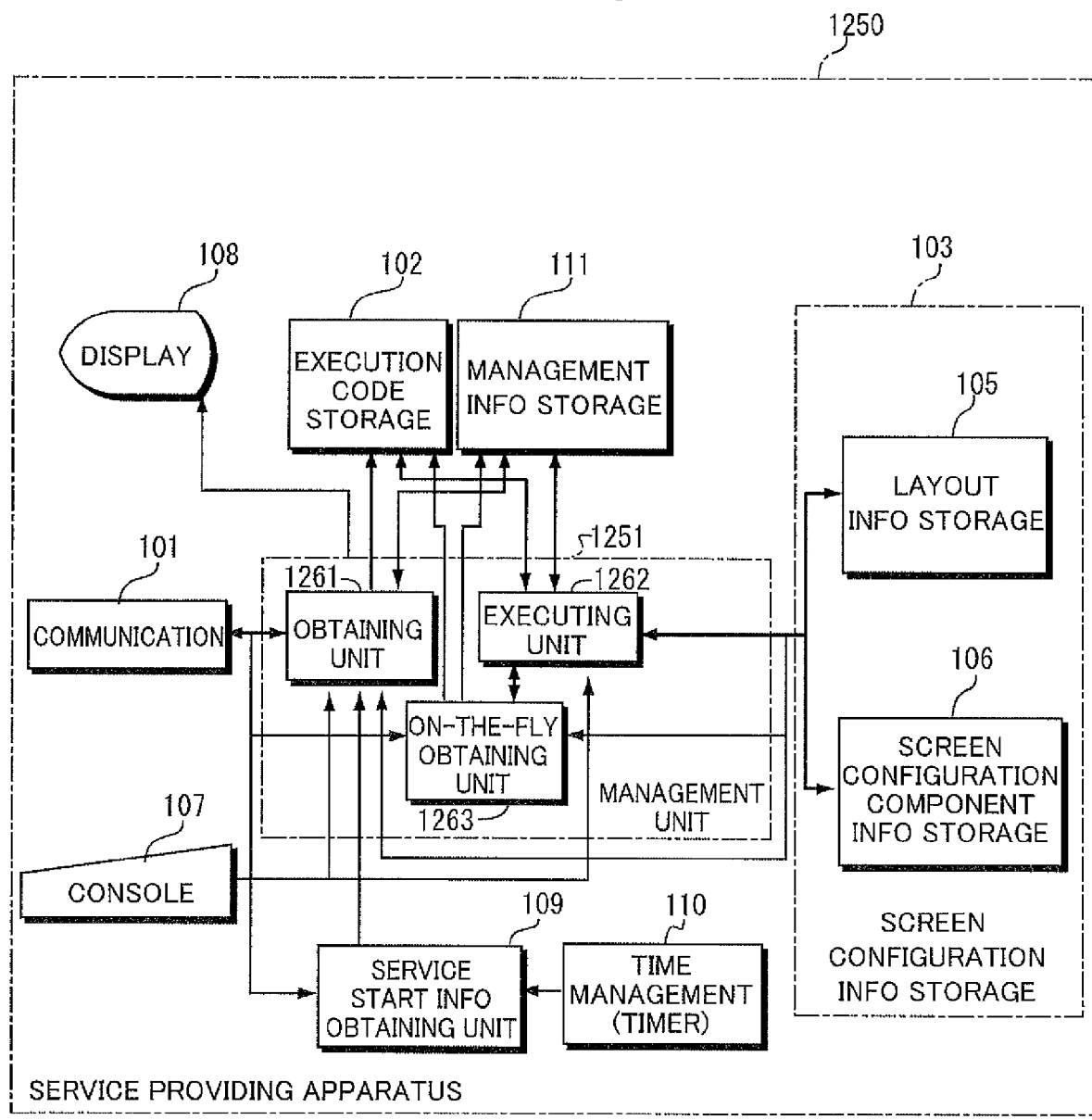
FIG. 13 is a block diagram of a service providing apparatus 1250 in accordance with a third embodiment of the present invention.

FIG. 13 is a block diagram showing a configuration of the service providing apparatus 1250 in accordance with a third embodiment of the present invention. Referring to FIG. 13, service providing apparatus 1250 in accordance with the third embodiment has the functions of service providing apparatus 100 shown in FIG. 1 and, in addition, by this apparatus, it is possible to include, in an execution code, a description for designating whether other execution code and screen configuration information to be used at the time of executing the said execution code should be all obtained simultaneously at the time of obtaining the execution code, or they should be obtained when the execution code is executed. The obtained execution code is stored in execution code storage 102, and the screen configuration information is stored in screen configuration information storage 103, respectively. Specifically, in the service providing apparatus in accordance with the present embodiment, it is possible to manage the timing of obtaining other execution code and screen configuration information to be used at the time of executing an execution code, as will be described later.

Referring to FIG. 13, service providing apparatus 1250 includes, in place of management unit 104 of service providing apparatus 100 shown in FIG. 1, a management unit 1251 having the function of obtaining, at the time when the service is obtained, execution code or codes and screen configuration information other than those indicated to be obtained at the time of execution, and obtaining and executing these remaining execution code or codes and screen configuration information at the time of execution.

Management unit 1251 includes: an obtaining unit 1261 that obtains and analyzes, when an instruction to obtain a new service is given through console 107 or service start information obtaining unit 109, a first execution code necessary for executing the service from the server, obtaining execution code or codes and screen configuration information described therein other than those indicated to be obtained at the time of execution, and storing these in execution code storage 102 and screen configuration information storage 103, and storing information of these in management information storage 111; an executing unit 1262 reading, when execution of the service is designated through console 107, the execution code of the service from the execution code storage 102, analyzing and starting execution, and when an execution code or screen configuration information to be obtained at the time of execution is encountered, outputting an instruction to obtain the same, and when the necessary execution code and screen configuration information are obtained, resuming execution of the service; and an on-the-fly obtaining unit 1263 obtaining, in response to the instruction output from executing unit 1262, the execution code and the screen configuration information designated by the instruction from the server through communication unit 101 and storing these in execution code storage 102 and screen configuration information storage 103, respectively.

Figure 14:
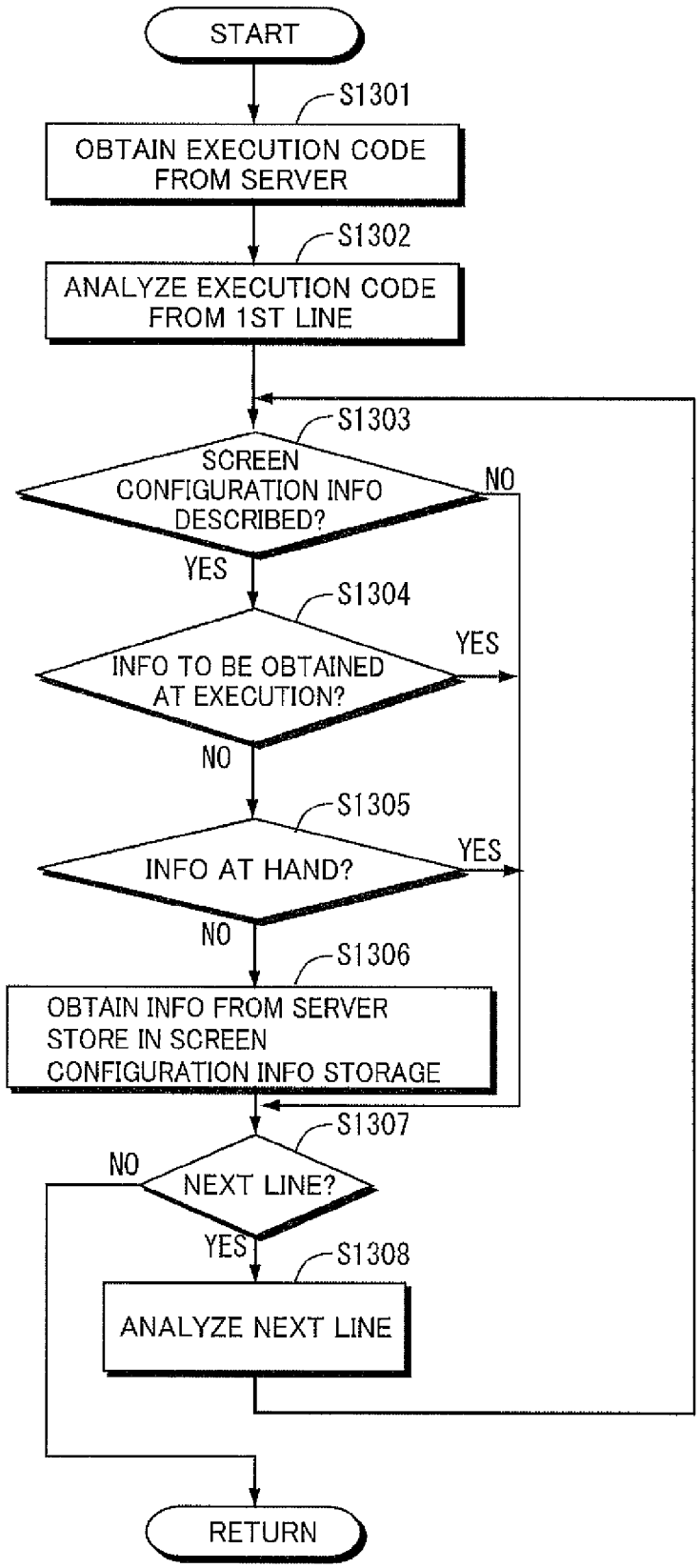
FIG. 14 is a flowchart of a program executed when a service is obtained, in service providing apparatus 1250 in accordance with the third embodiment of the present invention.

FIG. 14 is a flowchart of the process performed by obtaining unit 1261 of management unit 1251 in service providing apparatus 1250 in accordance with the third embodiment, when the service is obtained. The process steps S1301 to S1303 and S1305 to S1308 shown in FIG. 14 are the same as process steps S301 to S303 and S304 to S307 shown in FIG. 3, respectively, and, therefore, detailed description thereof will not be repeated. The process shown in FIG. 14 differs from that shown in FIG. 3 in that after S1303 (corresponding to S303), at S1304, based on a description of other execution code and screen configuration information included in the execution code, determination is made as to whether the other execution code and the screen configuration information are to be obtained at the time of execution (corresponding to the function of obtaining unit 1261). If it is determined that the configuration information is to be obtained at the time of execution, the process proceeds to S1307, and otherwise, proceeds to S1305. Specifically, if the other execution code and screen configuration information are to be obtained at the time of execution, no operation is done. If these are to be obtained at the time of obtaining the execution code rather than at the time of execution, these are obtained through the process of steps S1305 and S1306.

Figure 15:
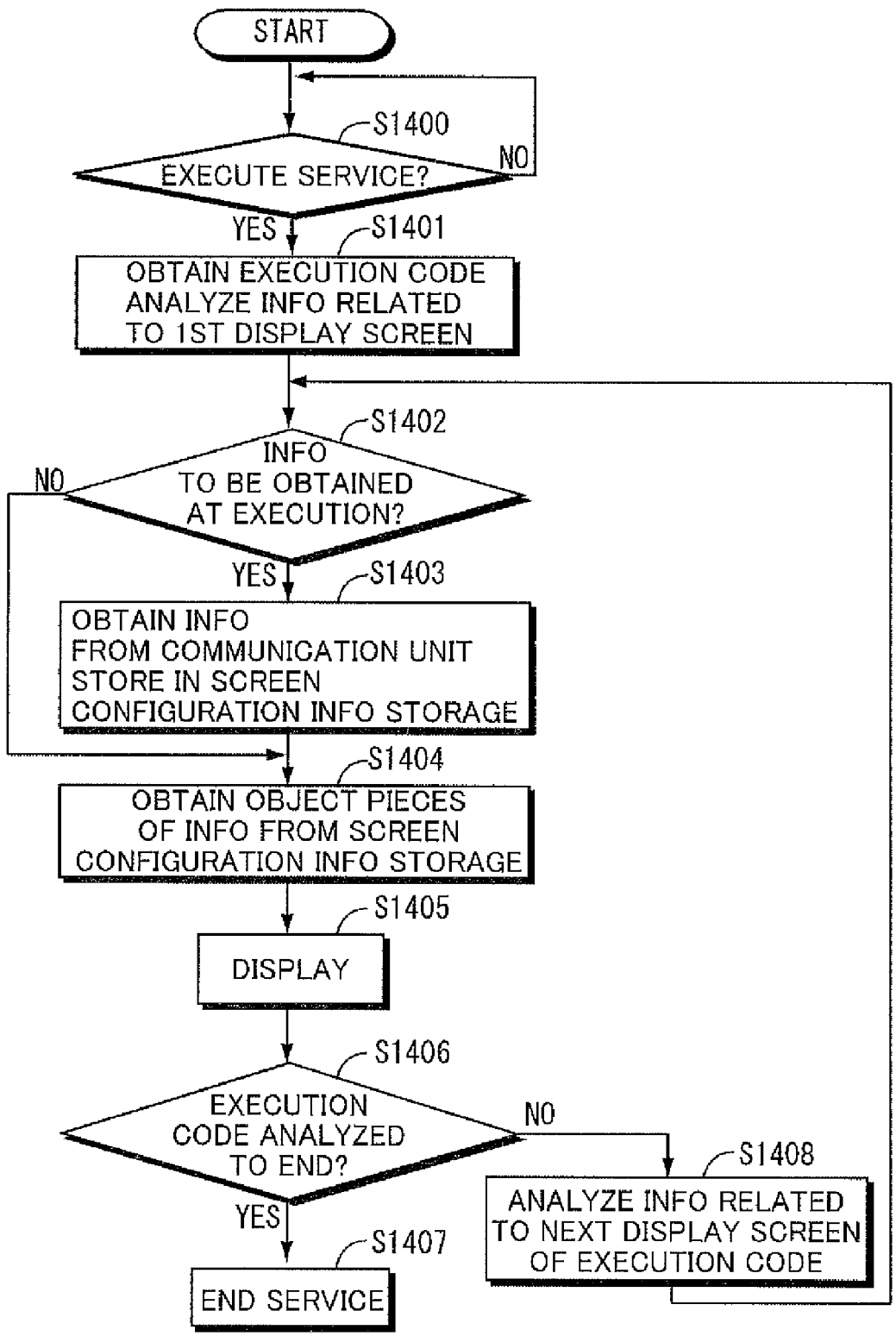
FIG. 15 is a flowchart of a program executed when a service is executed by service providing apparatus 1250 in accordance with the third embodiment of the present invention.

FIG. 15 is a flowchart of a program for realizing the process executed by executing unit 1262 of management unit 1251 when the service is executed. Referring to FIG. 15, at S1400, whether an instruction to execute a service stored in service providing apparatus 1250 has been received or not is determined. When the instruction to execute has been received, the flow proceeds to S1401, and if not, the process waits. At S1401, the execution code of the selected service is obtained from execution code storage 102, and analyzed to determine which screen configuration information is necessary to provide the first screen display. At S1402, whether the screen configuration information necessary for displaying the first screen display is one that is to be obtained at the time of execution or not is determined. If it is the information to be obtained at the time of execution, the flow proceeds to S1403, and if not, the flow proceeds to S1404.

At S1403, an instruction is given to on-the-fly obtaining unit 1263 to obtain necessary information. On-the-fly obtaining unit 1263 obtains the information from the server through communication unit 801, stores it in screen configuration information storage 103, and returns a signal indicating end of process to executing unit 1262. Then, the process proceeds to S1404.

At S1404, the screen configuration information as the object of display is obtained from screen configuration information storage 103. At S1405, based on the obtained screen configuration information, a screen is displayed on the display. At S1406, whether or not there is any portion left unanalyzed in the execution code is determined. If there is, the flow proceeds to F1408, and if analysis has been completed to the end, the flow proceeds to S1407. At S1408, information related to the next display screen of the execution code is analyzed, and the flow proceeds to S1402. At S1407, execution of the service ends. It is noted that, if the execution code includes a description that leads to a branch of the process depending on condition determination, it is possible to reach the end of execution code while unanalyzed portion or portions are left in the code. Even in that case, in the present embodiment, it is considered that executable portions of the execution code have been all analyzed, and the service ends.

In this example, the timing of obtaining the screen configuration information is limited to the time of obtaining the service or the time of executing the service. The present invention, however, is not limited to such an embodiment. The timing of obtaining may be changed depending on some conditions. For example, if the date and time when the service is obtained is after a prescribed time period, execution codes and screen configuration information may be all obtained at the time of obtaining the service.

Further, in the embodiment described above, the execution code and screen configuration information that are to be obtained not at the time of execution may be obtained at an arbitrary timing before execution. In most cases, such execution code or screen configuration information is obtained when it is encountered. It is possible, however, to obtain the execution codes and pieces of screen configuration information found by the analysis collectively and successively after the end of analysis of one execution code.

It is possible to obtain part of a service during execution, by using such a scheme as described in the third embodiment. Therefore, even a service having some contents changed frequently can be executed in a latest form, by obtaining only the screen configuration information and the execution code necessary to execute the changed service at the time of executing the service. Therefore, it is unnecessary for the service providing apparatus to obtain the full service every time a change is made to the service, and communication load can be alleviated.

In the embodiment above, it is assumed that the timing of switching of the screen is determined by a user operation. The present invention, however, is not limited to such an embodiment. The screen may be changed automatically if prescribed conditions are satisfied, for example, when a prescribed time period has passed.

In the embodiment above, at S1406, the timing of ending the service is determined depending on whether there is any information left unanalyzed in the execution code. The present invention, however, is not limited to such an embodiment. It is possible to end the service even when the end of execution code has not been reached. For example, it is possible to end the service if the user selects ending of the service, or when a transition to a prescribed screen is made.

In the present embodiment, at S1408, information related to the next screen display is analyzed. The "next screen display" here does not always correspond to the code portion immediately following the code portion that is being analyzed at present. The screen as the next object of display may be dynamically changed depending on user selection or the state of use, as described in the second embodiment. Therefore, executing unit 1262 of management unit 1251 manages the portion to be analyzed next, while determining the information to be the object of analysis at S1408.

Figure 16:
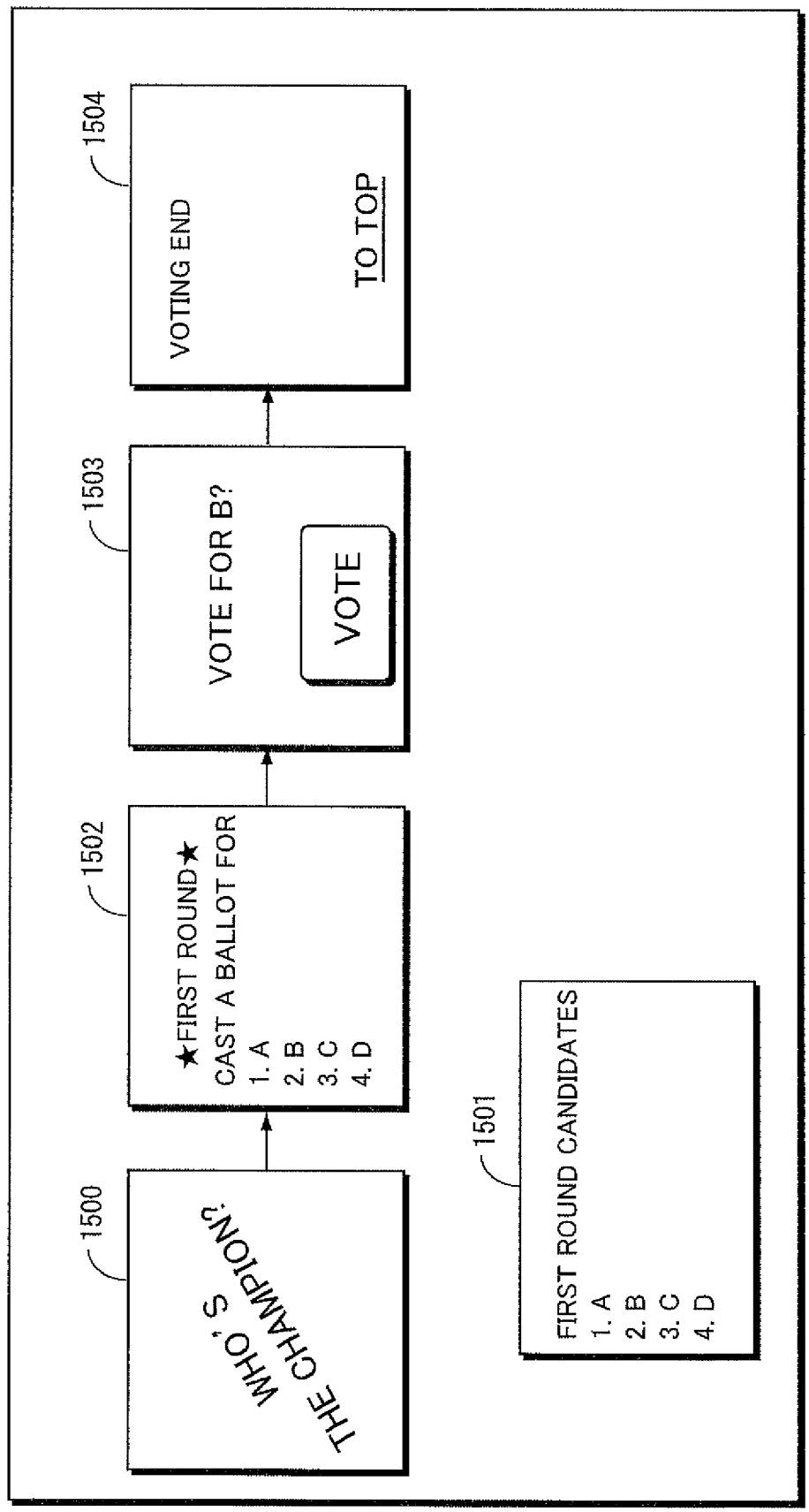
FIG. 16 shows an exemplary flow of a process in service providing apparatus 1250 in accordance with the third embodiment of the present invention.
Figure 17:
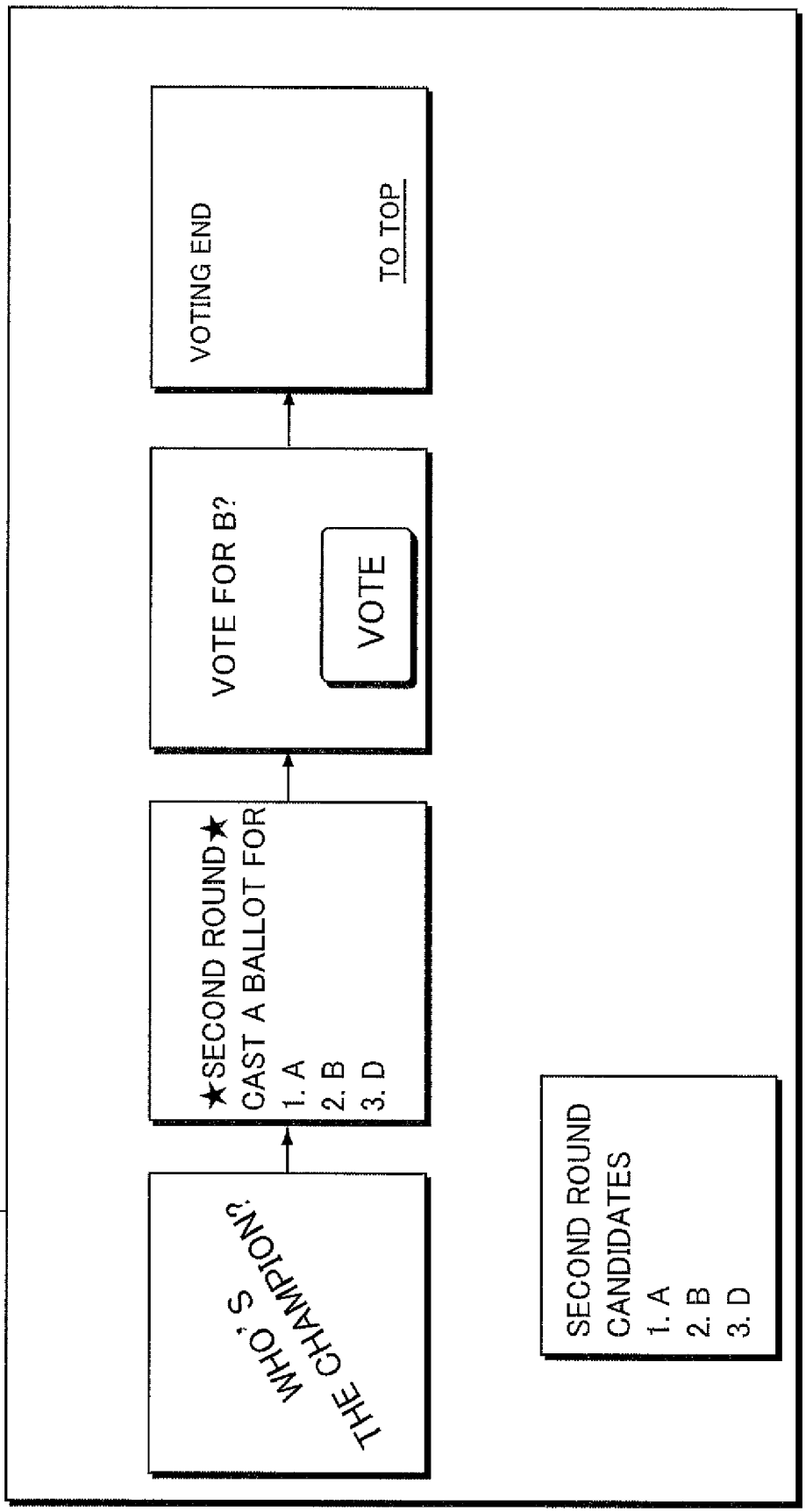
FIG. 17 shows an exemplary flow of a process when the screen configuration information to be used is changed, in the same service as that of FIG. 16, in service providing apparatus 1250 in accordance with the third embodiment of the present invention.
Figure 18:
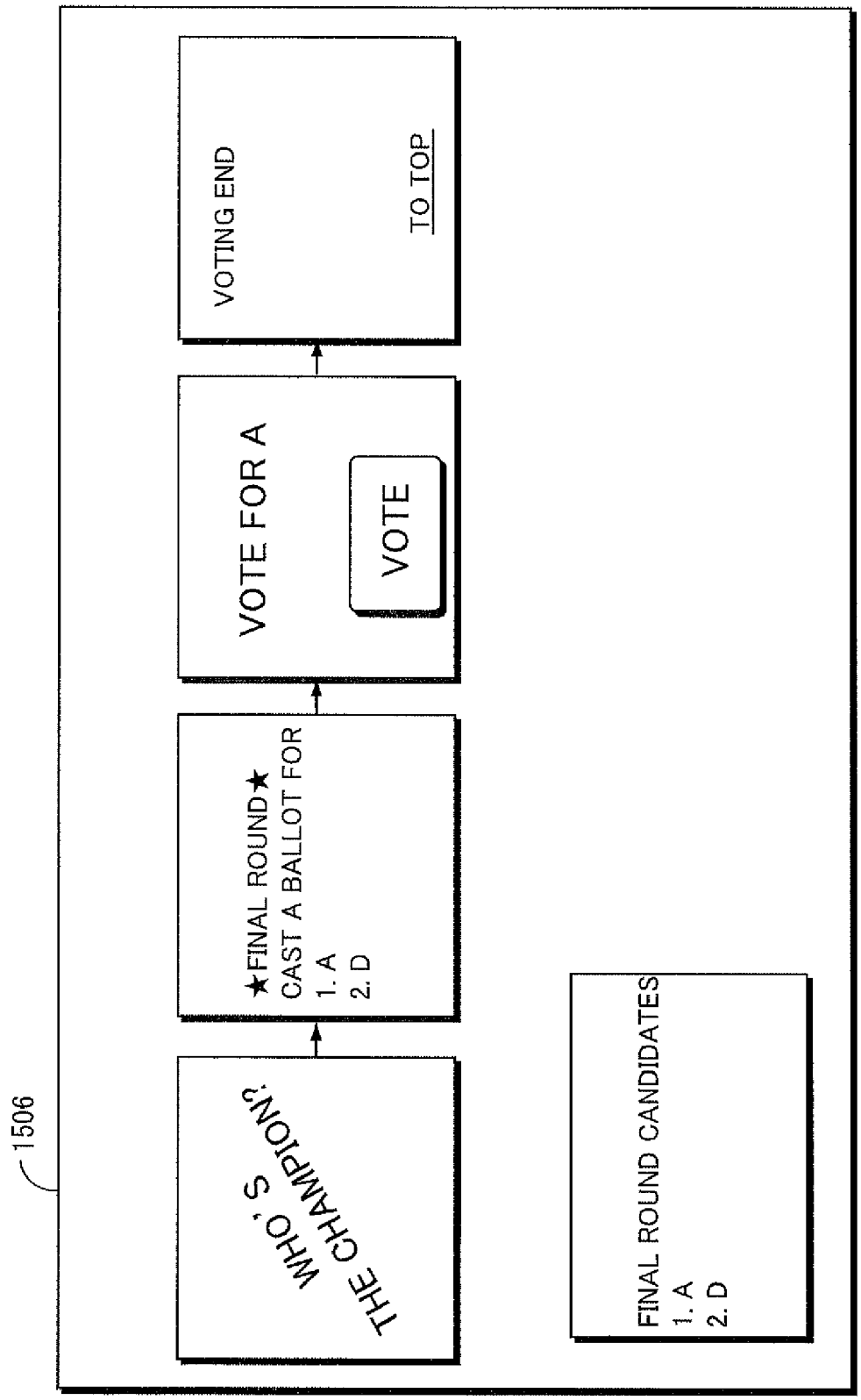
FIG. 18 shows an exemplary flow of a process when the screen configuration information to be used is further changed, in the same service as those of FIGS. 16 and 17, in service providing apparatus 1250 in accordance with the third embodiment of the present invention.

Referring to FIGS. 16 to 18, a specific example of the process flow of FIG. 15 will be described. Referring to FIG. 16, assume that there is a voting service involving vote for performers associated with a program context, while the user is viewing a television broadcast (hereinafter denoted as "TV"). The user is assumed to vote three times during the broadcast of the program. When execution of the service starts, the management unit obtains the screen configuration information from screen configuration information storage 103, and displays a screen 1500 on display 108. In response to a user operation, executing unit 1262 obtains candidate list information 1501 from communication unit 101, stores the same in screen configuration information storage 103, and thereafter, obtains candidate list information 1501 and other necessary screen configuration information, and displays a screen 1502.

The user selects any one of the candidates displayed on screen 1502 (screen 1503), transmits the selection information to the server, and the service ends (screen 1504). Similar process is performed as represented by screen transition 1505 of FIG. 17 and screen transition 1506 of FIG. 18, for the second and third voting. It is noted, however, that in screen transition 1505, a candidate information list including three candidates who are left after the first vote is used in place of candidate list information 1501 of FIG. 16, and in screen transition 1506, a candidate information list including two candidates who are left after the second voting is used.

In this manner, by the service providing apparatus in accordance with the present embodiment, even when the user executes the same service, processes of three different contents can be performed simply by changing the contents of candidate lists obtained at the time of execution.

When votes by viewers are received as the TV program proceeds as in the present embodiment, it follows that the viewers vote en masse. Therefore, in a conventional scheme in which the viewers access the Web page of the program and vote from a voting page, there is a considerable load on the server. This possibly makes smooth page transition difficult, when the user accesses the Web page, and comfortable service may not be available. This may lead to the user giving up the use of the service. When one tries to make an access to the server from a portable telephone to use the service, the process may be interrupted by some cause or another. In such a situation, it is often the case that the user must go back to the start to resume the process.

Using the scheme in accordance with the present embodiment, however, it is possible for the user to obtain beforehand most of the information necessary for using the service. Only minimum necessary information has to be obtained at the time of executing the service. Therefore, even when a large number of accesses concentrate to the server at the time of execution of the service, the amount of data to be processed is small and, therefore, load on the server can be alleviated. Therefore, better response is realized, and the user can enjoy comfortable service.

In the embodiment described above, the server side does not know which user obtained execution codes of what service. The present invention, however, is not limited to such an embodiment. A scheme may be possible in which the server side manages users who obtained execution codes and the like necessary for using services, and at the time of providing a service, the server may pass the information to the corresponding user.

According to the service providing apparatus in accordance with the embodiments, by changing part of the information for executing the service at the time of executing the service, the service contents can be changed with minimum communication load. For instance, in the product purchasing service such as described with reference to the second embodiment, it is very easy to constantly present latest product information to the user, to present inventory information of the products and to present new services.

In the embodiments above, when the screen configuration information and the like are obtained at the time of execution, they can be obtained without any condition. The present invention, however, is not limited to such an embodiment. For example, whether a piece of information held in the server is newer than a piece of information already stored in the service providing apparatus or not may be determined, and only when it is newer, the information may be obtained. Further, the screen configuration information and the like may not be obtained every time a service is executed, but may be obtained at a prescribed interval, or only when prescribed conditions are satisfied.

In the embodiments described above, the screen configuration information and the like obtained at the time of executing a service are determined by the execution code obtained beforehand. The present invention, however, is not limited to such an embodiment. For instance, the information to be obtained at the time of executing a service may be dynamically changed in accordance with a user selection, environment of the service providing apparatus or some other conditions. By such a function, it becomes possible, for example, to change the provided layout information to match the size of display screen of the service providing apparatus.

As described above, according to the embodiments of the present invention, a service execution code and screen configuration information necessary for executing the service are obtained and held in the service providing apparatus, and using these, the service is executed by the service providing apparatus. Therefore, it is possible to use information that facilitates customization for each user but not to be passed to the server. For example, it is possible to customize character size and font, background pattern and the like of the screen as preferred by the user. Further, if the service providing apparatus is implemented by a computer, it is possible to automatically change the layout if a plurality of applications are running simultaneously and the area for displaying the service is small.

Further, in the service providing apparatus in accordance with the embodiments above, it is possible to share the screen configuration components among service execution codes.

Therefore, if the information unique to the user, such as a card number, an identification number for using a service or the like is stored for one screen configuration component, the execution code can provide a service using such information. As a result, unlike Web service, it becomes unnecessary to log-in every time one uses a service.

In service providing apparatus 1250 in accordance with the third embodiment, the change in execution code and the configuration information as effected in the second embodiment is not performed at the time of executing the service. The present invention, however, is not limited to such an embodiment. The process of changing the execution code or screen configuration information such as performed in the second embodiment may be incorporated in the service providing apparatus 1250 in accordance with the third embodiment.

The service providing apparatuses in accordance with the embodiments described above may be all realized by a computer program executed by a general purpose computer. The computer must be provided with a communication device. Except for this point, the computer may be of an ordinary configuration. The control structure of the computer program is as shown in FIGS. 2, 3, 9, 14 and 15.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

INDUSTRIAL APPLICABILITY

The present invention is applicable to apparatuses that provide various services to users, through transition among a plurality of screens.

The invention claimed is:

1. A service providing apparatus for providing a service that requires the display of a plurality of screens, by obtaining from outside an execution code specifying each screen transition at the time of execution and by executing the code, comprising:

a display apparatus operable to display the screens needed to provide each service;

a communication unit operable to communicate with an external source providing at least one prescribed service by providing the execution code for providing each specified screen transition required to provide the prescribed service;

a first obtaining unit operable to communicate with the external source to designate and obtain prescribed execution codes from said external source through said communication unit;

an execution code storage unit operable to store at least the prescribed execution codes obtained by said first obtaining unit;

a screen configuration information storage unit operable to store pieces of screen configuration information for determining each screen configuration of each screen displayed by said display apparatus when a designated execution code is executed to provide a designated service; and a management unit operable to manage said first obtaining unit, said execution code storage unit, and said screen configuration information storage unit such that by the time provision of an arbitrary service starts, an execution code and screen configuration information necessary for providing the arbitrary service are stored in said execution code storage unit and said screen configuration information storage unit, respectively, the management unit then being responsive to reception of a service provision instruction designating the arbitrary service to perform the designated arbitrary service using the execution code corresponding to the designated arbitrary service extracted from the execution code stored in said execution code storage unit and, the screen configuration information extracted from the screen configuration information stored by said screen configuration information storage unit corresponding to the execution code corresponding to the designated arbitrary service being performed; wherein a service execution code for providing a particular service has a piece of obtaining time information allocated to indicate a time to obtain another execution code or screen configuration information necessary for executing said service code; and said management unit includes, an obtaining time information detector operable to detect the another execution code or the screen configuration information described in the service execution code which is obtained by said first obtaining unit and has said obtaining time information allocated, a second obtaining unit operable to obtain the another execution code or the screen configuration information described in the service execution code which is obtained by said first obtaining unit and does not have said obtaining time information allocated at an arbitrary timing, a third obtaining unit operable to obtain said another execution code or said screen configuration information detected by said obtaining time information detector as having said obtaining time information allocated at a time in accordance with the obtaining time information and to store in said execution code storage unit or said screen configuration information storage unit, respectively, and an executing unit operable to execute a service execution code corresponding to the designated arbitrary service stored in said execution code storage unit in response to the reception of the service provision instruction and performing the designated arbitrary service using the screen configuration information stored by said screen configuration information storage unit.

2. The service providing apparatus according to claim 1, wherein said management unit includes a portion operable to obtain a piece of screen configuration information not stored in said screen configuration information storage unit among the pieces of screen configuration information necessary for executing a prescribed execution code stored in said execution code storage unit so as to provide a corresponding prescribed service, and a portion operable to execute the designated arbitrary service using an execution code corresponding to the designated arbitrary service stored in said execution code storage unit with the display of screens corresponding to the designated arbitrary service using the screen configuration information stored in said screen configuration information storage unit.

3. The service providing apparatus according to claim 2, wherein said management unit further includes a portion operable to obtain a further execution code not stored in said execution code storage unit, among the execution codes corresponding to the designated arbitrary service stored in said execution code storage unit, the further execution code being required to perform the designated arbitrary service.

4. The service providing apparatus according to claim 3, wherein said execution code is a service script.

5. The service providing apparatus according to claim 3, wherein said execution code is a binary code.

6. The service providing apparatus according to claim 1, wherein each of said execution codes and said pieces of screen configuration information is allocated with an identifier allowing identification;

said execution code for providing said designated arbitrary service is associated with the identifier of an execution code used at the time of executing the execution code or the identifier of a piece of screen configuration information used at the time of executing the execution code for providing said designated arbitrary service; and said management unit is operable to manage said first obtaining unit, said execution code storage unit and said screen configuration information storage unit based on the identifier allocated to each of said execution codes and the identifier allocated to each of said pieces of screen configuration information.

7. The service providing apparatus according to claim 6, wherein said screen configuration information includes a screen configuration component as an element forming the screen, and layout information defining a layout of the screen configuration component on the screen.

8. The service providing apparatus according to claim 7, wherein said layout information is related to an identifier of a screen configuration component displayed in accordance with the layout; and said management unit is operable to manage said first obtaining unit, said execution code storage unit and said screen configuration information storage unit based on the identifier of the piece of screen configuration information used by the layout information included in an execution code for providing a service.

9. The service providing apparatus according to claim 8, wherein said execution code includes a code for calling another execution code; and said management unit includes a portion operable to manage said first obtaining unit, said execution code storage unit, and said screen configuration information storage unit such that by the time provision of the designated arbitrary service starts, an execution code necessary to provide the designated arbitrary service, the another execution code called by said execution code, and screen configuration information are stored in said execution code storage unit and said screen configuration information storage unit, respectively, and a portion operable to execute the execution code corresponding to the designated arbitrary service in response to reception of the service provision instruction designating the designated arbitrary service, the execution code corresponding to the designated arbitrary service, and the screen configuration information stored in said screen configuration information storage unit associated with the execution code corresponding to the designated arbitrary service being performed.

10. The service providing apparatus according to claim 9, wherein said management unit includes a portion operable to change contents of the screen configuration information stored in said screen configuration information storage in accordance with a prescribed condition.

11. The service providing apparatus according to claim 1, wherein said execution code includes a description of changing the execution code or screen configuration information used for executing the designated arbitrary service in accordance with a prescribed condition;

said management unit includes a portion operable to manage said first obtaining unit, said execution code storage unit, and said screen configuration information storage unit such that by the time provision of any designated arbitrary service starts, the corresponding execution code and screen configuration information necessary for providing the designated arbitrary service are stored in said execution code storage unit and said screen configuration information storage unit, respectively, and a portion operable to execute the execution code corresponding to the designated arbitrary service extracted from the execution code stored in said execution code storage unit so as to perform said designated arbitrary service using the screen configuration information extracted from the screen configuration information stored by said screen configuration information storage unit corresponding to the execution code corresponding to the designated arbitrary service being performed; and said portion operable to execute the execution code corresponding to the designated arbitrary service is operable to change an execution code or screen configuration information used at the time of executing said designated arbitrary service in accordance with a description of the execution code as an object of execution.

12. The service providing apparatus according to claim 1, wherein said execution code includes a description of changing an execution path of the execution code used for executing the designated arbitrary service in accordance with a prescribed condition;

said management unit includes a portion operable to manage said first obtaining unit, said execution code storage unit and said screen configuration information storage unit such that by the time provision of any designated arbitrary service starts, the corresponding execution code and screen configuration information necessary for providing the designated arbitrary service are stored in said execution code storage unit and said screen configuration information storage unit, respectively, and a portion operable to execute the execution code corresponding to the designated arbitrary service extracted from the execution code stored in said execution code storage unit so as to perform said designated arbitrary service using the screen configuration information extracted from the screen configuration information stored by said screen configuration information storage unit corresponding to the execution code corresponding to the designated arbitrary service; and said portion operable to execute said execution code corresponding to the designated arbitrary service is further operable to change the execution path at the time of executing said designated arbitrary service in accordance with a description of the execution code as an object of execution.

13. The service providing apparatus according to claim 1, further comprising a service start information unit operable to access a new service provision source of providing a new service through said communication unit, and upon detection of availability of the new service from the new service provision source, the service start information unit is further operable to cause said first obtaining unit to obtain a new execution code for providing said new service from the new service provision source.

14. The service providing apparatus according to claim 13, wherein said service start information obtaining unit includes a portion operable to periodically access said new service provision source and upon detection of the availability of the new service from the new service provision source, a portion operable to cause said first obtaining unit to obtain the new execution code for providing said new service from the new service provision source.

15. The service providing apparatus according to claim 13, wherein said service start information obtaining unit includes a portion operable to receive an instruction by a user to obtain the new service, and a portion operable to access the new service provision source in response to the instruction by the user, and operable to cause said first obtaining unit to obtain the new execution code for providing said new service from the new service provision source.

16. The service providing apparatus according to claim 1, further comprising:

a capacity securing unit operable to perform a process of securing, in at least one of said execution code storage unit and said screen configuration information storage unit, a capacity equal to or larger than the capacity necessary for storing execution codes and pieces of screen configuration information associated with an execution code to be obtained by said first obtaining unit before said first obtaining unit obtains the execution code from said external source.

17. The service providing apparatus according to claim 16, wherein said capacity securing unit includes a portion operable to delete an execution code satisfying a prescribed condition and screen configuration information associated with the execution code satisfying the prescribed condition from said execution code storage unit and said screen configuration information storage unit, respectfully, and a portion operable to repeatedly operate said portion operable to delete the execution code satisfying the prescribed condition and the screen configuration information associated with the execution code satisfying the prescribed condition until a capacity equal to or larger than the capacity necessary for storing the execution code and screen configuration information associated with the execution code to be obtained by said first obtaining unit is secured in said execution code storage unit and said screen configuration information storage unit, respectively.

18. The service providing apparatus according to claim 17, wherein said prescribed condition is that the execution code to be deleted is a least recently used execution code.

19. The service providing apparatus according to claim 17, wherein
said prescribed condition is that the execution code to be deleted is a least frequently used execution code.

20. The service providing apparatus according to claim 17, wherein
said prescribed condition is that the execution code to be deleted is an execution code stored longest in said execution code storage unit.

21. The service providing apparatus according to claim 17, wherein
said prescribed condition is that the execution code to be deleted is an execution code of which frequency of use is not higher than a prescribed value.

22. The service providing apparatus according to claim 16, wherein
said capacity securing unit includes a portion operable to delete at least part of the execution code or the screen configuration information for providing the designated arbitrary service in connection with a service not used for a prescribed time period from last use.

23. The service providing apparatus according to claim 1, wherein
a time limited service has a piece of information allocated for indicating an available time period permitted to use the time limited service as the designated arbitrary service;
said service providing apparatus further comprising:
a deleting unit operable to delete at least part of the execution code or the screen configuration information related to the time limited service for which the available time period has expired from said execution code storage unit or said screen configuration information storage unit.

24. The service providing apparatus according to claim 1, wherein
a use limited service has a piece of information allocated for indicating an available number of uses of the use limited service as the designated arbitrary service;
said service providing apparatus further comprising:
a counter operable to count a number of times the use limited service having said piece of information indicating available number of uses has been used as the designated arbitrary service; and
deleting unit operable to delete at least part of the execution code or the screen configuration information related to the use limited service that has been provided for the available number of uses as the designated arbitrary service as counted by the counter.

25. The service providing apparatus according to claim 1, wherein
said second obtaining unit includes a portion operable to successively obtain said another execution code or said screen configuration information described in the service execution code obtained by said first obtaining unit as needed and not having said obtaining time information allocated, after said first obtaining unit obtained said service execution code.

26. The service providing apparatus according to claim 1, wherein
said obtaining time information indicates that said another execution code and said screen configuration information are to be obtained at the time of execution of said service execution code for providing said particular service; and
said third obtaining unit includes a portion operable to obtain the another execution code and the screen configuration information necessary to execute the service execution code for providing the service designated by the instruction in response to said executing unit receiving said instruction from another apparatus through said communication unit and to store in said execution code storage unit and said screen configuration information storage unit, respectively.

27. The service providing apparatus according to claim 1, wherein
said obtaining time information indicates that said another execution code and said screen configuration information are to be obtained, in response to reception of a prescribed notice from a provision source for providing said service execution code for providing said particular service, from said provision source; and
said third obtaining unit includes a portion operable to obtain the another execution code and the screen configuration information necessary for executing the service execution code for providing the service designated by said prescribed notice in response to reception of said prescribed notice from said provision source through said communication unit, and to store in said execution code storage unit and said screen configuration information storage unit, respectively.

* * * * *